US012578522B2

(12) United States Patent
Yin et al.

(10) Patent No.: US 12,578,522 B2
(45) Date of Patent: Mar. 17, 2026

(54) LIGHT DIFFUSION FILM COMPRISING A PLURALITY OF LIGHT DIFFUSION PARTICLES, POLARIZER AND DISPLAY DEVICE

(71) Applicant: TCL CHINA STAR OPTOELECTRONICS TECHNOLOGY CO., LTD., Shenzhen (CN)

(72) Inventors: Hongshan Yin, Shenzhen (CN); Ji Li, Shenzhen (CN); Kai Chen, Shenzhen (CN); Guang Zeng, Shenzhen (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 326 days.

(21) Appl. No.: 18/233,845

(22) Filed: Aug. 14, 2023

(65) Prior Publication Data

US 2025/0012959 A1 Jan. 9, 2025

(30) Foreign Application Priority Data

Jul. 5, 2023 (CN) ........................ 202310814879.2

(51) Int. Cl.
*G02B 5/30* (2006.01)
*G02B 5/02* (2006.01)
*G02F 1/1335* (2006.01)

(52) U.S. Cl.
CPC ......... *G02B 5/3025* (2013.01); *G02B 5/0278* (2013.01); *G02F 1/133504* (2013.01); *G02F 2203/03* (2013.01)

(58) Field of Classification Search
CPC .................................................. G02F 2203/03
See application file for complete search history.

(56) References Cited

U.S. PATENT DOCUMENTS

2007/0054123 A1* 3/2007 Hashiba ................ C08F 291/00
428/407
2020/0117032 A1* 4/2020 Chan .................. G02F 1/13306

FOREIGN PATENT DOCUMENTS

CN 101545994 A 9/2009
CN 103293575 A * 9/2013

(Continued)

OTHER PUBLICATIONS

Chinese Office Action issued in corresponding Chinese Patent Application No. 202310814879.2 dated Aug. 2, 2023, pp. 1-7, 17pp.

(Continued)

*Primary Examiner* — Paul C Lee
(74) *Attorney, Agent, or Firm* — The Roy Gross Law Firm, LLC; Roy D. Gross

(57) ABSTRACT

Disclosed are a light diffusion film, a polarizer and a display device. The light diffusion film includes a substrate with a glass transition temperature ranging from 70° C. to 600° C. The substrate includes a first type of substrate and a second type of substrate, and the second type of substrate is mixed in the first type of substrate. The light diffusion particles are dispersed in the substrate. The mass fraction of the first type of substrate in the substrate is greater than or equal to 60%. The mass fraction of the second type of substrate in the substrate is less than or equal to 40%.

18 Claims, 3 Drawing Sheets

(56) References Cited

FOREIGN PATENT DOCUMENTS

| | | | | | |
|---|---|---|---|---|---|
| CN | 104793274 | A | * | 7/2015 | ........... G02B 5/0268 |
| EP | 2397872 | B1 | | 12/2013 | |
| JP | 2008046497 | A | | 2/2008 | |

OTHER PUBLICATIONS

German Office Action issued in corresponding German Patent Application No. 10 2023 129 080.0, dated Jan. 17, 2024, pp. 1-10, 18pp.

* cited by examiner

LIGHT DIFFUSION FILM COMPRISING A PLURALITY OF LIGHT DIFFUSION PARTICLES, POLARIZER AND DISPLAY DEVICE

CROSS-REFERENCE TO RELATED APPLICATION

The present disclosure claims priority to and the benefit of Chinese Patent Application No. 202310814879.2, filed on Jul. 5, 2023, the disclosure of which is incorporated herein by reference in its entirety.

TECHNICAL FIELD

The present disclosure relates to the field of display, and in particular, to a light diffusion film, a polarizer, and a display device.

BACKGROUND OF INVENTION

At present, in order to expand the chromaticity viewing angle of a display device, an optical film for expanding the chromaticity viewing angle is usually disposed on the outermost side of a polarizer. An existing optical film used to expand the chromaticity viewing angle adopts a prism structure or adds light diffusion particles into an adhesive, which has optical defects such as moire patterns are easily generated by the prism structure or white spots are easily generated since the light diffusion particles are difficult to disperse. As a result, display effect of the display device is limited.

Accordingly, there is an urgent need for a light diffusion film, a polarizer, and a display device to solve the above-mentioned technical problems.

SUMMARY OF INVENTION

The present disclosure provides a light diffusion film, a polarizer, and a display device, which can alleviate the technical problems of optical defects such as moire patterns or white spots caused by optical films that expand the chromaticity viewing angle at present.

The present disclosure provides a light diffusion film, which includes:

a substrate with a glass transition temperature ranging from 70° C. to 600° C., the substrate includes a first type of substrate and a second type of substrate, and the second type of substrate is mixed in the first type of substrate; and a plurality of light diffusion particles dispersed in the substrate;

a mass fraction of the first type of substrate in the substrate is greater than or equal to 60%, and a mass fraction of the second type of substrate in the substrate is less than or equal to 40%; and the first type of substrate is selected from one of a modified or an unmodified polyester, a modified or an unmodified polyolefin and a modified or an unmodified cellulose; the second type of substrate is selected from at least one of a modified or an unmodified polyester, a modified or an unmodified polyolefin and a modified or an unmodified cellulose; and the second type of substrate is different from the first type of substrate.

Optionally, the first type of substrate is selected from one of an unmodified cellulose triacetate, an unmodified polyethylene terephthalate, an unmodified polycarbonate, an unmodified polymethylmethacrylate and an unmodified polyethylene naphthalate; and the second type of substrate is selected from at least one of a modified polyethylene terephthalate, an unmodified cellulose triacetate, an unmodified polycarbonate, an unmodified polymethylmethacrylate and an unmodified polyethylene naphthalate, and the second type of substrate is different from the first type of substrate.

Optionally, the plurality of light diffusion particles include a plurality of first type of light diffusion particles and/or a plurality of second type of light diffusion particles;

a ratio of a length of a long-axis of each of the plurality of first type of light diffusion particles to a diameter of each of the plurality of first type of light diffusion particles is greater than or equal to 20 and is less than or equal to 100; and a ratio of a length of a long-axis of each of the plurality of second type of light diffusion particles to a diameter of each of the plurality of second type of light diffusion particles is greater than or equal to 1 and is less than or equal to 5.

Optionally, the plurality of first type of light diffusion particles are selected from at least one type of a first sub-type of light diffusion particles, a second sub-type of light diffusion particles, a third sub-type of light diffusion particles, a fourth sub-type of light diffusion particles, and a fifth sub-type of light diffusion particles with shapes different from each other, and the plurality of second type of light diffusion particles are selected from at least one type of a sixth sub-type of light diffusion particles and a seventh sub-type of light diffusion particles with shapes different from each other;

a variation value of a diameter of each of the first sub-type of light diffusion particles is less than or equal to 0.3 microns in an extension direction of a long-axis of each of the first sub-type of light diffusion particles;

in an extension direction of a long-axis of each of the second sub-type of light diffusion particles, a variation value of a diameter of a middle portion of each of the second sub-type of light diffusion particles is less than or equal to 1 micron; and in a direction away from the middle portion of each of the second sub-type of light diffusion particles, a diameter of a first end portion of each of the second sub-type of light diffusion particles gradually decreases, and a variation value of a diameter of a second end portion of each of the second sub-type of light diffusion particles is less than or equal to 1 micron;

in an extension direction of a long-axis of each of the third sub-type of light diffusion particles, a variation value of a diameter of a middle portion of each of the third sub-type of light diffusion particles is less than or equal to 1 micron; and in a direction away from the middle portion of each of the third sub-type of light diffusion particles, a diameter of a first end portion of each of the third sub-type of light diffusion particles gradually decreases, and a diameter of a second end portion of each of the third sub-type of light diffusion particles gradually decreases;

a first end portion of each of the fourth sub-type of light diffusion particles is sequentially connected with a second end portion of each of the fourth sub-type of light diffusion particles, and a diameter of each of the fourth sub-type of light diffusion particles gradually decreases in a direction from the first end portion of each of the fourth sub-type of light diffusion particles to the second end portion of each of the fourth sub-type of light diffusion particles;

a first end portion of each of the fifth sub-type of light diffusion particles is sequentially connected with a second end portion of each of the fifth sub-type of light diffusion particles, a diameter of the first end portion of each of the fifth sub-type of light diffusion particles gradually decreases in a direction away from the second end portion of each of the fifth sub-type light diffusion particles, and a diameter of the second end portion of each of the fifth sub-type of light diffusion particles gradually decreases in a direction away from the first end portion of each of the fifth sub-type of light diffusion particles;

a variation value of a diameter of each of the sixth sub-type of light diffusion particles is less than or equal to 0.3 microns in an extension direction of a long-axis of each of the sixth sub-type of light diffusion particles; and a first end portion of each of the seventh sub-type of light diffusion particles is sequentially connected with a second end portion of each of the seventh sub-type of light diffusion particles, a diameter of the first end portion of each of the seventh sub-type of light diffusion particles gradually decreases in a direction away from the second end portion of each of the seventh sub-type light diffusion particles, and a diameter of the second end portion of each of the seventh sub-type of light diffusion particles gradually decreases in a direction away from the first end portion of each of the seventh sub-type of light diffusion particles.

Optionally, the first sub-type of light diffusion particles is selected from rod-shaped particles, the second sub-type of light diffusion particles is selected from needle-shaped particles with reduced diameters at one end, the third sub-type of light diffusion particles is selected from needle-shaped particles with reduced diameters at both ends, the fourth sub-type of light diffusion particles is selected from long cone-shaped particles, the fifth sub-type of light diffusion particles is selected from bi-conical-shaped particles, the sixth sub-type of light diffusion particles is selected from cube-shaped particles or cuboid-shaped particles, and the seventh sub-type of light diffusion particles is selected from spherical particles or ellipsoidal particles.

Optionally, the plurality of light diffusion particles further include a plurality of third type of light diffusion particles, and materials of the plurality of third type of light diffusion particles are the same as those of the plurality of second type of substrate;

the plurality of third type of light diffusion particles are selected from at least one type of the first sub-type of light diffusion particles, the second sub-type of light diffusion particles, the third sub-type of light diffusion particles, the fourth sub-type of light diffusion particles, the fifth sub-type of light diffusion particles, the sixth sub-type of light diffusion particles and the seventh sub-type of light diffusion particles.

Optionally, the first type of substrate is miscible with the second type of substrate, the mass fraction of the first type of substrate in the substrate is greater than or equal to 70%, and the mass fraction of the second type of substrate in the substrate is less than or equal to 30%;

the plurality of light diffusion particles are composed of the plurality of first type of light diffusion particles and the plurality of second type of light diffusion particles; or, the plurality of light diffusion particles are composed of at least one of the plurality of first type of light diffusion particles and the plurality of second type of light diffusion particles, and the plurality of third type of light diffusion particles.

Optionally, the first type of substrate is immiscible with the second type of substrate, the mass fraction of the first type of substrate in the substrate is greater than or equal to 60% and less than or equal to 70%;

the mass fraction of the second type of substrate in the substrate is greater than or equal to 30% and less than or equal to 40%; and the plurality of third type of light diffusion particles are selected from at least one type of the first sub-type of light diffusion particles, the second sub-type of light diffusion particles, the third sub-type of light diffusion particles, the fourth sub-type of light diffusion particles and the fifth sub-type of light diffusion particles.

Optionally, the first type of substrate is immiscible with the second type of substrate, the mass fraction of the first type of substrate in the substrate is greater than 70%, and the mass fraction of the second type of substrate in the substrate is less than 30%;

the plurality of third type of light diffusion particles are selected from at least one type of the sixth sub-type of light diffusion particles and the seventh sub-type of light diffusion particles.

The present disclosure further provides a polarizer including the above-mentioned light diffusion film.

The present disclosure further provides a display device including the above-mentioned polarizer.

According to embodiments of the present disclosure, the optical performance of the substrate is improved by adding the second type of substrate to the first type of substrate. Further, the optical defects such as moire pattern or white spots caused by the light diffusion film are avoided, and the chromaticity viewing angle and the contrast of the display device using the light diffusion film are improved by dispersing the light diffusion particles in the substrate.

BRIEF DESCRIPTION OF THE DRAWINGS

In order to more clearly describe the technical solutions in embodiments of the present disclosure, hereinafter, the appended drawings used for describing the embodiments in the present disclosure will be briefly introduced. Apparently, the appended drawings described below are only directed to some embodiments of the present disclosure, and for a person skilled in the art, without expenditure of creative labor, other drawings can be derived on the basis of these appended drawings.

EMBODIMENTS OF INVENTION

Figure 1:
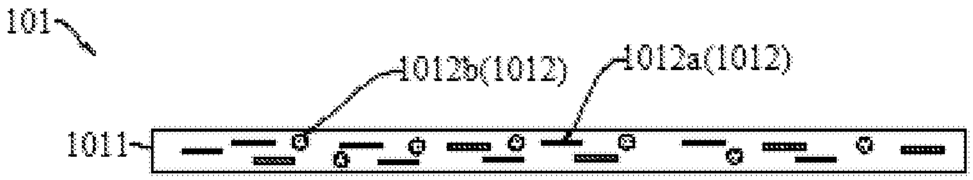
FIG. 1 is a schematic diagram of a first configuration of a light diffusion film according to some embodiments of the present disclosure.

Hereinafter, technical solutions in embodiments of the present disclosure will be clearly and completely described with reference to the accompanying drawings in embodiments of the present disclosure. Apparently, the described embodiments are part of, but not all of, the embodiments of the present disclosure. All the other embodiments, obtained by a person with ordinary skill in the art on the basis of the embodiments in the present disclosure without expenditure of creative labor, belong to the protection scope of the present disclosure. In addition, it should be understood that specific embodiments described herein are only used to illustrate and explain the present disclosure, and are not intended to limit the present disclosure. In the present disclosure, unless otherwise stated, orientation words such as "up" and "down" generally refers to "up" and "down" in the actual use or working state of a device, and specifically refers to the drawing direction in the drawings; while "inside" and "outside" refer to outline of a device.

Currently, an optical film used to diffuse the chromaticity viewing angle adopts a prism structure or adds light diffusion particles into an adhesive, so that the optical film is liable to cause optical defects such as molar lines or white spots, which leads to optical defects such as moire patterns or white spots are easily generated, and there is a technical problem that the display quality of a display device using an optical film is difficult to improve.

and there is a technical problem that it is difficult to improve the display quality of a display device using an optical film.

Referring to FIGS. 1-4, embodiments of the present disclosure provide a light diffusion film 101, which includes a substrate 1011 and a plurality of light diffusion particles 1012. The substrate 1011 has a glass transition temperature ranging from 70° C. to 600° C. The substrate 1011 includes a first type of substrate and a second type of substrate, wherein the second type of substrate is mixed in the first type of substrate. The plurality of light diffusion particles 1012 are dispersed in the substrate 1011. A mass fraction of the first type of substrate in the substrate 1011 is greater than or equal to 60%, and a mass fraction of the second type of substrate in the substrate 1011 is less than or equal to 40%. The first type of substrate is selected from one of a modified or unmodified polyester, a modified or unmodified polyolefin and a modified or unmodified cellulose. The second type of substrate is selected from at least one of a modified or unmodified polyester, a modified or unmodified polyolefin and a modified or unmodified cellulose, and the second type of substrate is different from the first type of substrate.

According to embodiments of the present disclosure, the optical performance of the substrate 1011 is improved by adding the second type of substrate to the first type of substrate. Further, the optical defects such as moire pattern or white spots caused by the light diffusion film 101 are avoided, and the chromaticity viewing angle and the contrast of the display device using the light diffusion film 101 are improved by dispersing the light diffusion particles 1012 in the substrate 1011.

The technical solutions of the present disclosure will now be described with reference to specific embodiments.

In this embodiment, when the first type of substrate is miscible with the second type of substrate are (that is, the first type of substrate is well miscible with the second type of substrate, and the first type of substrate and the second type of substrate can be uniformly mixed with each other), for example, when both the material of the first type of substrate and the material of the second type of substrate are lipophilic materials, or when both the material of the first type of substrate and the material of the second type of substrate are hydrophilic materials, the first type of substrate and the second type of substrate may be uniformly mixed with each other, thereby improving optical performance of the substrate 1011 in terms of crystallinity, tensile properties, light transmittance, and the like.

Figure 4:
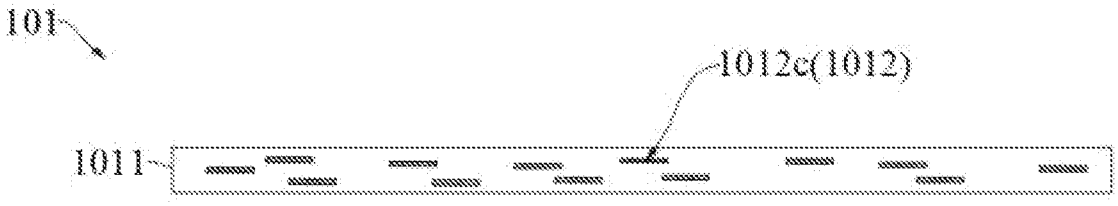
FIG. 4 is a schematic diagram of a fourth configuration of a light diffusion film according to some embodiments of the present disclosure.

When the first type of substrate and the second type of substrate are poorly miscible (i.e., the first type of substrate and the second type of substrate are immiscible with each other), for example, the material of the first type of substrate is a lipophilic material, and the material of the second type of substrate is a hydrophilic material, or the material of the first type of substrate is a hydrophilic material, and the material of the second type of substrate is a lipophilic material, and the second type of substrate is mixed with the first type of substrate and dispersed in the first type of substrate to form optical particles of at least one shape, thereby improving optical performance of the substrate 1011. When the second type of substrate is dispersed in the first type of substrate, the light diffusion particles 1012 may be composed of optical particles formed by the second type of substrate (as shown in FIG. 4).

Figure 2:
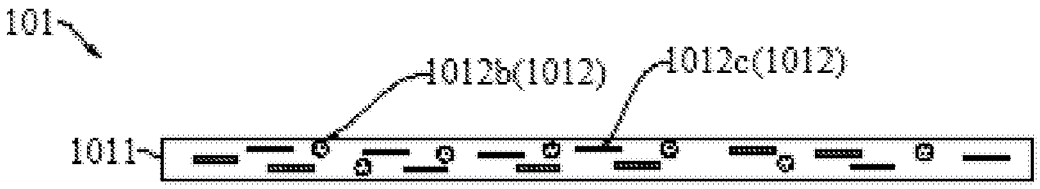
FIG. 2 is a schematic diagram of a second configuration of a light diffusion film according to some embodiments of the present disclosure.
Figure 3:
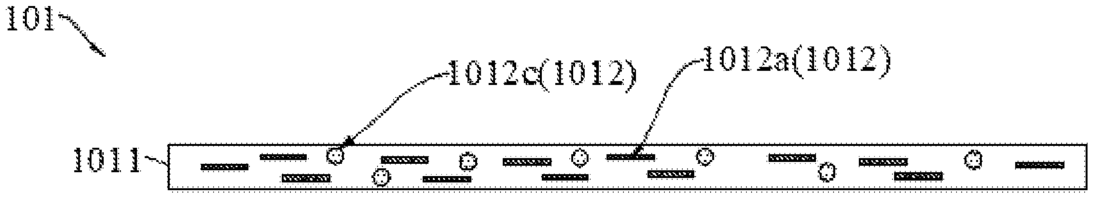
FIG. 3 is a schematic diagram of a third configuration of a light diffusion film according to some embodiments of the present disclosure.

Referring to FIGS. 1 to 3, in this embodiment, the light diffusion particles 1012 include a first type of light diffusion particles 1012*a* and/or a second type of light diffusion particles 1012*b*.

The ratio of the length of the long-axis of the first type of light diffusion particle 1012*a* to the diameter of the first type of light diffusion particle 1012*a* is greater than the ratio of the length of the long-axis of the second type of light diffusion particle 1012*b* to the diameter of the second type of light diffusion particle 1012*b*.

In some embodiments, the light diffusion particles 1012 include first type of light diffusion particles 1012*a* and second type of light diffusion particles 1012*b*. The mixing of the first type of light diffusion particles 1012*a* with a relative large length-diameter ratio (the ratio of the long-axis to the diameter) and the second type of light diffusion particles 1012*b* is beneficial to improve the effect of improving the chromaticity viewing angle of the light diffusion film 101 through the first type of light diffusion particles 1012*a* with a large length-diameter ratio, and improve the haze of the light diffusion film 101 through the second type of light diffusion particles 1012*b* with a small length-diameter ratio. Therefore, the light diffusion film 101 has a larger chromaticity viewing angle and an anti-glare function.

Referring to FIGS. 2-4, in some embodiments, the light diffusion particles 1012 further include a third type of light diffusion particles 1012*c*, and the materials of the third type of light diffusion particles 1012*c* are the same as those of the second type of substrate. When the first type of substrate and the second type of substrate are uniformly mixed with each other, the materials of the third type of light diffusion particles 1012*c* are the same as those of the second type of substrate, thereby improving the dispersibility of the third type of light diffusion particles 1012*c* in the substrate 1011, reducing problems such as agglomeration of the third type of light diffusion particles 1012*c* in the substrate 1011, and improving the optical performance of the light diffusion film 101. When the second type of substrate is dispersed in the first type of substrate, the third type of light diffusion particles 1012*c* may be formed from the second type of substrate, so as to reduce the amount of the light diffusion particles 1012 additionally added to the substrate 1011, and reduce problems such as agglomeration of the light diffusion particles 1012 in the substrate 1011, thereby improving the optical performance of the light diffusion film 101.

The ratio of the length of the long-axis of the third type of light diffusion particles 1012*c* to the diameter of the third type of light diffusion particles 1012*c* may be greater than the ratio of the length of the long-axis of the second type of light diffusion particles 1012*b* to the diameter of the second type of light diffusion particles 1012*b*. Alternatively, the ratio of the length of the long-axis of the third type of light diffusion particles 1012*c* to the diameter of the third type of light diffusion particles 1012*c* may be less than the ratio of the length of the long-axis of the first type of light diffusion particles 1012*a* to the diameter of the first type of light diffusion particles 1012*a*.

Referring to FIGS. 2 and 3, in some embodiments, when the ratio of the length of the long-axis of the third type of light diffusion particles 1012*c* to the diameter of the third type of light diffusion particles 1012*c* is greater than the ratio of the length of the long-axis of the second type of light diffusion particles 1012*b* to the diameter of the second type of light diffusion particles 1012*b*, the light diffusion particles 1012 include the third type of light diffusion particles 1012*c* and the second type of light diffusion particles 1012*b*. Alternatively, when the ratio of the length of the long-axis of the third type of light diffusion particles 1012*c* to the diameter of the third type of light diffusion particles 1012*c* is less than the ratio of the length of the long-axis of the first type of light diffusion particles 1012*a* to the diameter of the first type of light diffusion particles 1012*a*, the light diffusion particles 1012 include the third type of light diffusion particles 1012*c* and the first type of light diffusion particles 1012*a*. The mixing of the two types of light diffusion particles 1012 with large difference in aspect ratio is beneficial to the light diffusion film 101 to have a better chromaticity viewing angle and contrast improvement effect and an anti-glare function.

In some embodiments, the light diffusion particles 1012 may include the first type of light diffusion particles 1012*a*, the second type of light diffusion particles 1012*b* and the third type of light diffusion particles 1012*c*.

Each of the light diffusion particles 1012 has a long-axis and a diameter, and a length of the long-axis of each of the light diffusion particles 1012 is a distance between two ends of the long-axis of the light diffusion particles 1012.

In some embodiments, the ratio of the length of the long-axis of the first type of light diffusion particles 1012*a* to the diameter of the first type of light diffusion particles 1012*a* is greater than or equal to 20 and less than or equal to 100, for example, it may be 25, 30, 35, 45, 50, 65, 70, 75, 80, 85, 90, 95, or the like.

The ratio of the length of the long-axis of the second light diffusion particles 1012*b* to the diameter of the second light diffusion particles 1012*b* is greater than or equal to 1 and less than or equal to 5, for example, it may be 1.1, 1.2, 1.3, 1.4, 1.5, 1.6, 1.7, 1.8, 1.9, 2, 2.2, 2.5, 2.8, 3, 3.5, 4, 4.5, or the like.

The ratio of the length of the long-axis of the third type of light diffusion particles 1012*c* to the diameter of the third type of light diffusion particles 1012*c* is greater than or equal to 20 and less than or equal to 100, for example, it may be 25, 30, 35, 45, 50, 65, 70, 75, 80, 85, 90, 95, or the like. Alternatively, the ratio of the length of the long-axis of the third type of light diffusion particles 1012*c* to the diameter of the third type of light diffusion particles 1012*c* is greater than or equal to 1 and less than or equal to 5, for example, it may be 1.1, 1.2, 1.3, 1.4, 1.5, 1.6, 1.7, 1.8, 1.9, 2, 2.2, 2.5, 2.8, 3, 3.5, 4, 4.5, or the like.

By setting the aspect ratio of the light diffusion particles 1012 with longer aspect ratio to be greater than or equal to 20 and less than or equal to 100, and setting the aspect ratio of the light diffusion particles 1012 with shorter aspect ratio to be greater than or equal to 1 and less than or equal to 5, it is more beneficial to improve the effect of improving the chromaticity viewing angle of the light diffusion film 101 through the light diffusion particles 1012 with longer aspect ratio, and improve the haze of the light diffusion film 101 through the light diffusion particles 1012 with shorter aspect ratio.

In some embodiments, the first type of light diffusion particles 1012*a* is selected from at least one type of a first sub-type of light diffusion particles, a second sub-type of light diffusion particles, a third sub-type of light diffusion particles, a fourth sub-type of light diffusion particles, and a fifth sub-type of light diffusion particles with shapes different from each other. The second type of light diffusion particles 1012*b* are selected from at least one type of a sixth sub-type of light diffusion particles and a seventh sub-type of light diffusion particles with shapes different from each other.

When the aspect ratio of the third type of light diffusion particles 1012*c* is greater than or equal to 20 and less than or equal to 100, the third type of light diffusion particles 1012*c* is selected from at least one type of the first sub-type of light diffusion particles, the second sub-type of light diffusion particles, the third sub-type of light diffusion particles, the fourth sub-type of light diffusion particles, and the fifth sub-type of light diffusion particles. When the aspect ratio of the third type of light diffusion particles 1012*c* is greater than or equal to 1 and less than or equal to 5, the third type of light diffusion particles 1012*c* is selected from at least one type of the sixth sub-type of light diffusion particles and the seventh sub-type of light diffusion particles.

A variation value of a diameter of each of the first sub-type of light diffusion particles is less than or equal to 0.3 microns in an extension direction of a long-axis of each of the first sub-type of light diffusion particles, for example, it may be 0 micron, 0.28 microns, 0.25 microns, 0.22 microns, 0.2 microns, 0.18 microns, 0.15 microns, 0.12 microns, 0.1 microns, 0.08 microns, 0.05 microns, 0.02 microns, and the like. In some embodiments, in the extension direction of a long-axis of each of the first sub-type of light diffusion particles, a diameter of a first end portion of the first sub-type of light diffusion particles is the same as a diameter of a middle portion of the first sub-type of light diffusion particles, and a diameter of a second end portion of the first sub-type of light diffusion particles is the same as a diameter of a middle portion of the first sub-type of light diffusion particles.

In some embodiments, the first sub-type of light diffusion particles may be rod-shaped particles, and when the first sub-type of light diffusion particles is rod-shaped, the cross-section of each of the first sub-type of light diffusion particles on a plane perpendicular to the long-axis of each of the first sub-type of light diffusion particles is circular or elliptical. When the orthographic projection of each of the first sub-type of light diffusion particles on the plane perpendicular to the long-axis of each of the first sub-type of light diffusion particles is elliptical, the diameter of each of the first sub-type of light diffusion particles is the length of the long-axis of the ellipse, and the ratio of the long-axis of the ellipse to the short-axis of the ellipse is greater than 1 and less than or equal to 3, for example, it may be 1.2, 1.5, 1.8, 2, 2.2, 2.5, 2.8, or the like.

In an extension direction of a long-axis of each of the second sub-type of light diffusion particles, a variation value of a diameter of a middle portion of each of the second sub-type of light diffusion particles is less than or equal to 1 micron, for example, it may be 0 micron, 0.95 microns, 0.8 microns, 0.78 microns, 0.75 microns, 0.72 microns, 0.7 microns, 0.68 microns, 0.65 microns, 0.62 microns, 0.6 microns, 0.58 microns, 0.55 microns, 0.52 microns, 0.5 microns, 0.48 microns, 0.45 microns, 0.42 microns, 0.4 microns, 0.38 microns, 0.35 microns, 0.32 microns, 0.3 microns, 0.28 microns, 0.25 microns, 0.22 microns, 0.2 microns, 0.18 microns, 0.15 microns, 0.12 microns, 0.1 microns, 0.08 microns, 0.05 microns, 0.02 microns, or the like. In a direction away from the middle portion of each of the second sub-type of light diffusion particles, a diameter of a first end portion of each of the second sub-type of light diffusion particles gradually decreases, and a variation value of a diameter of a second end portion of each of the second sub-type of light diffusion particles is less than or equal to 1 micron, for example, it may be may be 0 micron, 0.95 microns, 0.8 microns, 0.78 microns, 0.75 microns, 0.72 microns, 0.7 microns, 0.68 microns, 0.65 microns, 0.62 microns, 0.6 microns, 0.58 microns, 0.55 microns, 0.52 microns, 0.5 microns, 0.48 microns, 0.45 microns, 0.42 microns, 0.4 microns, 0.38 microns, 0.35 microns, 0.32 microns, 0.3 microns, 0.28 microns, 0.25 microns, 0.22 microns, 0.2 microns, 0.18 microns, 0.15 microns, 0.12 microns, 0.1 microns, 0.08 microns, 0.05 microns, 0.02 microns, or the like. In some embodiments, in a direction away from the middle portion of each of the second sub-type of light diffusion particles, the diameter of a first end portion of each of the second sub-type of light diffusion particles gradually decreases, and the diameter of the second end portion of the second sub-type of light diffusion particles is the same as the diameter of the middle portion of the second sub-type of light diffusion particles 1012.

In some embodiments, second sub-type of light diffusion particles is selected from needle-shaped particles with reduced diameters at one end.

In some embodiments, the orthographic projection of each of the second sub-type of light diffusion particles on a plane perpendicular to each of the long-axis of the second sub-type of light diffusion particles may be circular or elliptical. When the orthographic projection of the second end portion of each of the second sub-type of light diffusion particles or the orthographic projection of the middle portion of each of the second sub-type of light diffusion particles on a plane perpendicular to the long-axis of each of the second sub-type of light diffusion particles is elliptical, the ratio of the long-axis of the ellipse to the short-axis of the ellipse is greater than 1 and less than or equal to 3, for example, it may be 1.2, 1.5, 1.8, 2, 2.2, 2.5, 2.8, or the like. The cross-sectional shape of the first end portion of each of the second sub-type of light diffusion particles formed on any plane perpendicular to the long-axis of each of the second sub-type of light diffusion particles coincides with the cross-sectional shape of the middle portion of each of the second sub-type of light diffusion particles formed on any plane perpendicular to the long-axis of each of the second sub-type of light diffusion particles, and the area gradually decreases in a direction away from the middle portion of the second sub-type of light diffusion particles.

In an extension direction of a long-axis of each of the third sub-type of light diffusion particles, a variation value of a diameter of a middle portion of each of the third sub-type of light diffusion particles is less than or equal to 1 micron, for example, it may be 0 micron, 0.95 microns, 0.8 microns, 0.78 microns, 0.75 microns, 0.72 microns, 0.7 microns, 0.68 microns, 0.65 microns, 0.62 microns, 0.6 microns, 0.58 microns, 0.55 microns, 0.52 microns, 0.5 microns, 0.48 microns, 0.45 microns, 0.42 microns, 0.4 microns, 0.38 microns, 0.35 microns, 0.32 microns, 0.3 microns, 0.28 microns, 0.25 microns, 0.22 microns, 0.2 microns, 0.18 microns, 0.15 microns, 0.12 microns, 0.1 microns, 0.08 microns, 0.05 microns, 0.02 microns, or the like. In a direction away from the middle portion of each of the third sub-type of light diffusion particles, a diameter of a first end portion of each of the third sub-type of light diffusion particles gradually decreases, and a diameter of a second end portion of each of the third sub-type of light diffusion particles gradually decreases. In some embodiments, in the extension direction of the long-axis of each of the third sub-type of light diffusion particles, the diameter of the middle portion of each of the third sub-type of light diffusion particles is uniform, and the diameters of the first end portion of each of the third sub-type of light diffusion particles and the second end portion of each of the third sub-type of light diffusion particles gradually change.

In some embodiments, the third sub-type of light diffusion particles may be needle-shaped particles with reduced diameters at both ends.

In some embodiments, the orthographic projection of each of the third sub-type of light diffusion particles on a plane perpendicular to each of the long-axis of the third sub-type of light diffusion particles may be circular or elliptical. When the orthographic projection of middle portion of each of the third sub-type of light diffusion particles on the plane perpendicular to each of the long-axis of the third sub-type of light diffusion particles is elliptical, the ratio of the long-axis of the ellipse to the short-axis of the ellipse is greater than 1 and less than or equal to 3, for example, it may be 1.2, 1.5, 1.8, 2, 2.2, 2.5, 2.8, or the like. The cross-sectional shapes of the first end portion and the second end portion of each of the third sub-type of light diffusion particles formed on any plane perpendicular to the long-axis of each of the third sub-type of light diffusion particles coincides with the cross-sectional shape of the middle portion of each of the third sub-type of light diffusion particles formed on any plane perpendicular to the long-axis of each of the third sub-type of light diffusion particles, and the area gradually decreases in a direction away from the middle portion of the third sub-type of light diffusion particles.

A first end portion of each of the fourth sub-type of light diffusion particles is sequentially connected with a second end portion of each of the fourth sub-type of light diffusion particles, and a diameter of each of the fourth sub-type of light diffusion particles gradually decreases in a direction from the first end portion of each of the fourth sub-type of light diffusion particles to the second end portion of each of the fourth sub-type of light diffusion particles.

In some embodiments, the fourth sub-type of light diffusion particles may be long cone-shaped particles.

The cross-section of each of the fourth sub-type of light diffusion particles on a plane perpendicular to the long-axis of each of the fourth sub-type of light diffusion particles is circular or elliptical. In a direction from the first end portion of each of the fourth sub-type of light diffusion particles to the second end portion of each of the fourth sub-type of light diffusion particles, the cross-sectional shape of each of the fourth sub-type of light diffusion particles on the plane perpendicular to the long axis of each of the fourth sub-type light diffusion particles coincides with each other and gradually decreases in area. When the cross section of each of the fourth sub-type of light diffusion particles on the plane perpendicular to the long-axis of each of the fourth sub-type of light diffusion particles is elliptical, the diameter of each of the fourth sub-type light diffusion particles is the length of the long-axis of the ellipse, and the ratio of the long-axis of the ellipse to the short-axis of the ellipse is greater than 1 and less than or equal to 3, for example, it may be 1.2, 1.5, 1.8, 2, 2.2, 2.5, 2.8, or the like.

A first end portion of each of the fifth sub-type of light diffusion particles is sequentially connected with a second end portion of each of the fifth sub-type of light diffusion particles, a diameter of the first end portion of each of the fifth sub-type of light diffusion particles gradually decreases in a direction away from the second end portion of each of the fifth sub-type light diffusion particles, and a diameter of the second end portion of each of the fifth sub-type of light diffusion particles gradually decreases in a direction away from the first end portion of each of the fifth sub-type of light diffusion particles.

In some embodiments, the fifth sub-type of light diffusion particles may be bi-conical-shaped particles.

The cross-section of each of the fifth sub-type of light diffusion particles on a plane perpendicular to the long-axis of each of the fifth sub-type of light diffusion particles is circular or elliptical. In a direction away from the second end portion of the fifth sub-type of light diffusion particles, the cross-sectional shape of the first end portion of each of the fifth sub-type of light diffusion particles on the plane perpendicular to the long-axis of each of the fifth sub-type light diffusion particles coincides with each other and gradually decreases in area. In a direction away from the first end portion of the fifth sub-type of light diffusion particles, the cross-sectional shape of the second end portion of each of the fifth sub-type of light diffusion particles on the plane perpendicular to the long-axis of each of the fifth sub-type light diffusion particles coincides with each other and gradually decreases in area. When the cross section of each of the fifth sub-type of light diffusion particles on the plane perpendicular to the long-axis of each of the fifth sub-type of light diffusion particles is elliptical, the diameter of each of the fifth sub-type light diffusion particles is the length of the long-axis of the ellipse, and the ratio of the long-axis of the ellipse to the short-axis of the ellipse is greater than 1 and less than or equal to 3, for example, it may be 1.2, 1.5, 1.8, 2, 2.2, 2.5, 2.8, or the like.

The sixth sub-type of light diffusion particles is similar to the first sub-type of light diffusion particles. That is, in an extension direction of a long-axis of each of the sixth sub-type of light diffusion particles, a variation value of a diameter of each of the sixth sub-type of light diffusion particles is less than or equal to 0.3 microns, for example, it may be 0 micron, 0.28 microns, 0.25 microns, 0.22 microns, 0.2 microns, 0.18 microns, 0.15 microns, 0.12 microns, 0.1 microns, 0.08 microns, 0.05 microns, 0.02 microns, or the like. In some embodiments, the diameter of a first end portion of the sixth sub-type of light diffusion particles is the same as the diameter of a middle portion of the sixth sub-type of light diffusion particles, and the diameter of a second end portion of the first sub-type of light diffusion particles is the same as the diameter of a middle portion of the first sub-type of light diffusion particles.

The sixth sub-type of light diffusion particles differs from the first sub-type of light diffusion particles in that the ratio of the length of the long-axis of the sixth sub-type of light diffusion particles to the diameter of the sixth sub-type of light diffusion particles is less than the ratio of the length of the long-axis of the first sub-type of light diffusion particles to the diameter of the first sub-type of light diffusion particles. Meanwhile, the sixth sub-type of light diffusion particles are cube-shaped particles or cuboid-shaped particles, wherein the cross section of each of the sixth sub-type of light diffusion particles on a plane perpendicular to the long-axis of each of the sixth sub-type of light diffusion particles is square or rectangular, and the diameter of each of the sixth sub-type of light diffusion particles 1012 is the length of one side of the square or the length of the longer side of the rectangle. When the sixth sub-type of light diffusion particles are cube-shaped particles, the ratio of the long-axis of each of the sixth sub-type of light diffusion particles to the diameter of each of the sixth sub-type of light diffusion particles is 1.

The seventh sub-type of light diffusion particles is similar to the fifth sub-type of light diffusion particles. A first end portion of each of the seventh sub-type of light diffusion particles is sequentially connected with a second end portion of each of the seventh sub-type of light diffusion particles, a diameter of the first end portion of each of the seventh sub-type of light diffusion particles gradually decreases in a direction away from the second end portion of each of the seventh sub-type light diffusion particles, and a diameter of the second end portion of each of the seventh sub-type of light diffusion particles gradually decreases in a direction away from the first end portion of each of the seventh sub-type of light diffusion particles.

The seventh sub-type of light diffusion particles differs from the fifth sub-type of light diffusion particles 1012 in that: the ratio of the length of the long-axis of each of the seventh sub-type of light diffusion particles to the diameter of each of the fifth sub-type of light diffusion particles is less than the ratio of the length of the long-axis of each of the fifth sub-type of light diffusion particles to the diameter of each of the fifth sub-type of light diffusion particles. Meanwhile, the seventh sub-type of light diffusion particles are spherical particles or ellipsoidal particles, wherein the cross section of each of the seventh sub-type of light diffusion particles on a plane perpendicular to the long-axis of each of the seventh sub-type of light diffusion particles is circular or elliptical, and the diameter of each of the seventh sub-type of light diffusion particles 1012 is the diameter of the circle or the length of the long-axis of the ellipse. When the cross-section of each of the seventh sub-type of light diffusion particles on the plane of the long-axis of each of the seventh sub-type of light diffusion particles is elliptical, the ratio of the long-axis of the ellipse to the short-axis of the ellipse is greater than 1 and less than or equal to 3, for example, it may be 1.2, 1.5, 1.8, 2, 2.2, 2.5, 2.8, or the like. When the seventh sub-type of light diffusion particles are spherical particles, the ratio of the long-axis of each of the seventh sub-type light diffusion particles to the diameter of each of the seventh sub-type of light diffusion particles.

In some embodiments, when the light diffusion particles 1012 are composed of the first type of light diffusion particles 1012*a* and the second type of light diffusion particles 1012*b*, the first type of light diffusion particles 1012*a* is selected from the first sub-type of light diffusion particles, and the second type of light diffusion particles 1012*b* is selected from the seventh sub-type of light diffusion particles. When the light diffusion particles 1012 are composed of the first type of light diffusion particles 1012*a* and the third type of light diffusion particles 1012*c*, the first type of light diffusion particles 1012*a* is selected from the first sub-type of light diffusion particles, and the third type of light diffusion particles 1012*c* is selected from the seventh sub-type of light diffusion particles. When the light diffusion particles 1012 are composed of the second type of light diffusion particles 1012*b* and the third type of light diffusion particles 1012*c*, the third type of light diffusion particles 1012*c* is selected from the first sub-type of light diffusion particles, and the second type of light diffusion particles 1012*b* is selected from the seventh sub-type of light diffusion particles. The above combination is helpful to better improve the chromaticity viewing angle and the contrast of the light diffusion film 101, and to better improve the anti-glare function of the light diffusion film 101.

In some embodiments, the first sub-type of light diffusion particles 1012*a* is selected from at least two types of the first sub-type of light diffusion particles, the second sub-type of light diffusion particles, the third sub-type of light diffusion particles, the fourth sub-type of light diffusion particles and the fifth sub-type of light diffusion particles. Exemplarily, the first type of light diffusion particle 1012*a* is a mixture of the first sub-type of light diffusion particles, the second sub-type of light diffusion particles and the third sub-type of light diffusion particles. Alternatively, the first type of light diffusion particle 1012*a* is a mixture of the first sub-type of light diffusion particles, the fourth sub-type of light diffusion particles and the fifth sub-type of light diffusion particles. Alternatively, the first type of light diffusion particle 1012*a* is a mixture of the first sub-type of light diffusion particles, the second sub-type of light diffusion particles, the third sub-type of light diffusion particles, the fourth sub-type of light diffusion particles and the fifth sub-type of light diffusion particles. By setting first type of light diffusion particle 1012*a* being selected from at least two types of particles with different shapes, the diversity of the shapes of the first type of light diffusion particles 1012*a* is increased, and the optical anisotropy of the first type of light diffusion particles 1012*a* is increased, which is helpful to improve effect of improving the contrast and brightness of the first type of light diffusion particle 1012*a*. When the first type of light diffusion particle 1012*a* is selected from the first sub-type of light diffusion particles, the second sub-type of light diffusion particles and the third sub-type of light diffusion particles; or the first type of light diffusion particle 1012*a* is selected from the first sub-type of light diffusion particles, the fourth sub-type of light diffusion particles and the fifth sub-type of light diffusion particles; or the first type of light diffusion particle 1012*a* is a mixture of the first sub-type of light diffusion particles, the second sub-type of light diffusion particles, the third sub-type of light diffusion particles, the fourth sub-type of light diffusion particles and the fifth sub-type of light diffusion particles, wherein the mass fraction of the first sub-type of light diffusion particles in the first type of light diffusion particles 1012*a* ranges from 1% to 8%, for example, it may be 1.5%, 2%, 2.5%, 3%, 3.5%, 4%, 4.5%, 5%, 6%, 6.5%, 7% and 7.5%; the mass fraction of the second sub-type of light diffusion particles and/or the fourth sub-type of light diffusion particles in the first type of light diffusion particles 1012*a* ranges from 40% to 50%, for example, it may be 41%, 42%, 43%, 44%, 45%, 46%, 47%, 48%, 49%, or the like; the mass fraction of the third sub-type of light diffusion particles and/or the fifth sub-type of light diffusion particles in the first type of light diffusion particles 1012*a* ranges from 45% to 55%, for example, it may be 46%, 47%, 48%, 49%, 50%, 51%, 52%, 53%, 54%, or the like. The mixing of the first sub-type of light diffusion particles, the second sub-type of light diffusion particles and/or the fourth sub-type of light diffusion particles, the third sub-type of light diffusion particles and/or the fifth sub-type of light diffusion particles according to the above ratio contributes to further improve the effect of improving the contrast and brightness of the obtained light diffusion particles 1012.

In some embodiments, when the first type of light diffusion particles 1012*a* is selected from at least two types of the first sub-type of light diffusion particles, the second sub-type of light diffusion particles, the third sub-type of light diffusion particles, the fourth sub-type of light diffusion particles and the fifth sub-type of light diffusion particles, in order to increase the proportion of the first sub-type of light diffusion particles in the light diffusion particles 1012 to further improve the effect of improving the contrast and brightness of the obtained light diffusion particles 1012, the third type of light diffusion particles 1012*c* is selected from the first sub-type of light diffusion particles.

In some embodiments, the mass fraction of the first type of light diffusion particles 1012*a* and/or the third type of light diffusion particles 1012*c* in the light diffusion particles 1012 is greater than or equal to 70%, and the mass fraction of the second type of light diffusion particles 1012*b* and/or the third type of light diffusion particles 1012*c* in the light diffusion particles 1012 is less than or equal to 30%.

Specifically, when the light diffusion particles 1012 are composed of the first type of light diffusion particles 1012*a* and the second type of light diffusion particles 1012*b*, the mass fraction of the first type of light diffusion particles 1012*a* in the light diffusion particles 1012 is greater than or equal to 70%, for example, it may be 75%, 78%, 80%, 82%, 85%, 88%, 90%, 92%, 95%, 98%, or the like; and the mass fraction of the second type of light diffusion particles 1012*b* in the light diffusion particles 1012 is less than or equal to 30%, for example, it may be 5%, 8%, 10%, 12%, 15%, 18%, 20%, 22%, 25%, 28%, or the like.

When the ratio of the length of the long-axis of each of the third type of light diffusion particles 1012*c* to the diameter of each of the third type of light diffusion particles 1012*c* is greater than or equal to 20 and less than or equal to 100, and the light diffusion particles 1012 are composed of the third type of light diffusion particles 1012*c* and the second type of light diffusion particles 1012*b*, the mass fraction of the third type of light diffusion particles 1012*c* in the light diffusion particles 1012 is greater than or equal to 70%, for example, it may be 75%, 78%, 80%, 82%, 85%, 88%, 90%, 92%, 95%, 98%, or the like; and the mass fraction of the second type of light diffusion particles 1012*b* in the light diffusion particles 1012 is less than or equal to 30%, for example, it may be 5%, 8%, 10%, 12%, 15%, 18%, 20%, 22%, 25%, 28%, or the like.

When the ratio of the length of each of the long-axis of the third type of light diffusion particles 1012*c* to the diameter of each of the third type of light diffusion particles 1012*c* is greater than or equal to 1 and less than or equal to 5, and the light diffusion particles 1012 are composed of the first type of light diffusion particles 1012*a* and the third type of light diffusion particles 1012*c*, the mass fraction of the first type of light diffusion particles 1012*a* in the light diffusion particles 1012 is greater than or equal to 70%, for example, it may be 75%, 78%, 80%, 82%, 85%, 88%, 90%, 92%, 95%, 98%, or the like; and the mass fraction of the third type of light diffusion particles 1012*c* in the light diffusion particles 1012 is less than or equal to 30%, for example, it may be 5%, 8%, 10%, 12%, 15%, 18%, 20%, 22%, 25%, 28%, or the like.

When the ratio of the length of the long-axis of each of the third type of light diffusion particles 1012*c* to the diameter of each of the third type of light diffusion particles 1012*c* is greater than or equal to 20 and less than or equal to 100, and the light diffusion particles 1012 are composed of the first type of light diffusion particles 1012*a*, the third type of light diffusion particles 1012*c*, and the second type of light diffusion particles 1012*b*, a sum of the mass fractions of the first type of light diffusion particles 1012*a* and the third type of light diffusion particles 1012*c* in the light diffusion particles 1012 is greater than or equal to 70%, for example, it may be 75%, 78%, 80%, 82%, 85%, 88%, 90%, 92%, 95%, 98%, or the like; and the mass fraction of the second type of light diffusion particles 1012*b* in the light diffusion particles 1012 is less than or equal to 30%, for example, it may be 5%, 8%, 10%, 12%, 15%, 18%, 20%, 22%, 25%, 28%, or the like.

When the ratio of the length of the long-axis of each of the third type of light diffusion particles 1012*c* to the diameter of each of the third type of light diffusion particles 1012*c* is greater than or equal to 1 and less than or equal to 5, and the light diffusion particles 1012 are composed of the first type of light diffusion particles 1012*a*, the second type of light diffusion particles 1012*b* and the third type of light diffusion particles 1012*c*, the mass fraction of the first type of light diffusion particles 1012*a* in the light diffusion particles 1012 is greater than or equal to 70%, for example, it may be 75%, 78%, 80%, 82%, 85%, 88%, 90%, 92%, 95%, 98%, or the like; and a sum of the mass fractions of the second type of light diffusion particles 1012*b* and the third type of light diffusion particles 1012*c* in the light diffusion particles 1012 is less than or equal to 30%, for example, it may be 5%, 8%, 10%, 12%, 15%, 18%, 20%, 22%, 25%, 28%, or the like.

In some embodiments, the third type of light diffusion particles 1012*c* include a first part of the third type of light diffusion particles and a second part of the third type of the light diffusion particles. When the ratio of the length of the long-axis of the first part of the third type of light diffusion particles to the diameter of the first part of the third type of light diffusion particles is greater than or equal to 1 and less than or equal to 5. The ratio of the length of the long-axis of the second part of the third type of light diffusion particles to the diameter of the second part of the third type of light diffusion particles is greater than or equal to 20 and less than or equal to 100, a sum of the mass fractions of the first type of light diffusion particles 1012*a* and the first part of the third type of light diffusion particles in the light diffusion particles 1012 is greater than or equal to 70%, and a sum of the mass fractions of the second type of light diffusion particles 1012*b* and the second part of the third type of light diffusion particles in the light diffusion particles 1012 is less than or equal to 30%.

In some embodiments, when the light diffusion particles 1012 are composed of the first type of light diffusion particles 1012*a* and the second type of light diffusion particles 1012*b*, the mass fraction of the light diffusion particles 1012 in the light diffusion film 101 ranges from 0.1% to 30%, for example, it may be 0.5%, 1%, 1.5%, 2%, 2.5%, 3%, 4%, 5%, 8%, 10%, 13%, 15%, 18%, 20%, 23%, 25%, 28%, or the like, which is beneficial to play an obvious role of diffusing light while avoiding affecting the light transmittance of the light diffusion film 101. When the light diffusion particles 1012 include the third type of light diffusion particles 1012*c*, the mass fraction of the light diffusion particles 1012 in the light diffusion film 101 may be less than or equal to 70%. The addition of the third type of light diffusion particles 1012*c* is conducive to adding more light diffusion particles 1012 in the light diffusion film 101 without agglomeration, and it is further beneficial to further facilitate the effect of improving the performance of the light diffusion particles 1012 such as contrast, chromaticity viewing angle and haze in a wider range.

In some embodiments, the length of the long-axis of each of the first type of light diffusion particles 1012*a* is greater than or equal to 15 microns and less than or equal to 100 microns, for example, it may be 20 microns, 30 microns, 40 microns, 50 microns, 60 microns, 70 microns, 80 microns, 90 microns, or the like. The diameter of each of the first type of light diffusion particles 1012*a* may be greater than or equal to 0.1 microns and less than or equal to 5 microns, for example, it may be 0.5 microns, 1 micron, 1.5 microns, 2 microns, 2.5 microns, 3 microns, 4 microns, 5 microns, or the like. The length of the long-axis of each of the second type of light diffusion particles 1012*b* is greater than or equal to 0.5 microns and less than or equal to 20 microns, for example, it may be 1 micron, 2 microns, 5 microns, 8 microns, 10 microns, 12 microns, 15 microns, 18 microns, or the like. The diameter of each of the second type of light diffusion particles 1012*b* is greater than or equal to 0.1 microns and less than or equal to 10 microns, for example, it may be 0.5 microns, 1 micron, 2 microns, 5 microns, 8 microns, or the like.

When the ratio of the length of the long-axis of each of the third type of light diffusion particles 1012*c* to the diameter of each of the third type of light diffusion particles 1012*c* is greater than or equal to 20 and less than or equal to 100, the range of the length of the long-axis of each of the third type of light diffusion particles 1012*c* may be the same as that of the long-axis of each of the first type of light diffusion particles 1012*a*, and the range of the diameter of each of the third type of light diffusion particles 1012*c* may be the same as that of each of the first type of light diffusion particles 1012*a*. When the ratio of the length of the long-axis of each of the third type of light diffusion particles 1012*c* to the diameter of each of the third type of light diffusion particles 1012*c* is greater than or equal to 1 and less than or equal to 5, the range of the length of the long-axis of each of the third type of light diffusion particles 1012*c* may be the same as the range of the length of the long-axis of each of the second type of light diffusion particles 1012*b*, and the range of the diameter of each of the third type of light diffusion particles 1012*c* may be the same as the range of the diameter of each of the second type of light diffusion particles 1012*b*.

In some embodiments, the first type of light diffusion particles 1012*a* are whiskers. The material of the first type of light diffusion particles 1012*a* and the material of the second type of light diffusion particles 1012*b* are selected from at least one of silicon dioxide, silicon carbide, silicon nitride, zinc oxide, magnesium oxide, aluminum oxide, calcium sulfate, calcium carbonate, potassium titanate, and aluminum borate.

In some embodiments, the first type of light diffusion particles 1012*a* and/or the second type of light diffusion particles 1012*b* may be surface modified to facilitate dispersibility of the first type of light diffusion particles 1012*a* and/or the second type of light diffusion particles 1012_b_ in the substrate 1011 or to enhance functionality such as toughness of the first type of light diffusion particles 1012_a_ and/or the second type of light diffusion particles 1012_b_. When the first type of light diffusion particles 1012_a_ and/or the second type of light diffusion particles 1012_b_ are surface modified, the surface of the first type of light diffusion particles 1012_a_ and/or the second type of light diffusion particles 1012_b_ is modified by at least one of inorganic cations, inorganic anions, polymers, coupling agents, or surfactants. That is, the surfaces of the first type of light diffusion particles 1012_a_ and/or the second type of light diffusion particles 1012_b_ include at least one of inorganic cation groups, inorganic anion groups, polymer groups, coupling agent groups, or surfactant groups.

Specifically, the surfaces of the first type of light diffusion particles 1012_a_ and/or the second type of light diffusion particles 1012_b_ are modified by at least one material selecting from magnesium chloride, calcium chloride, barium chloride, strontium chloride, stearic acid, sodium stearate, zinc octadecanoate, sulfonate surfactants, thio-surfactants, titanates, aluminates, polyacrylamides, silanes, alkyl phosphates, aryl phosphates, alkyl phosphate salts, aryl phosohate salts, alkylolamide phosphate esters, alkylolamide phosphate, imidazoline phosphate esters, imidazoline phosphate, homopolyphosphate esters, homopolyphosphates, and siloxane phosphates. Exemplarily, the surfaces of the first type of light diffusion particles 1012_a_ and/or the second type of light diffusion particles 1012_b_ are modified by at least one of sulfonate surfactants or thio-surfactants. The sulfonate surfactants may be selected from at least one of alkyl sulfonates and fluoroalkyl sulfonates, and specifically, for example, at least one of sodium dodecyl sulfonate, sodium dodecyl benzene sulfonate, and sodium fluorododecyl sulfonate. The thio-surfactant may be selected from at least one of thiols, fluorothiols, and specifically, for example, at least one of octadecanethiol, dodecanethiol, tetradecanethiol, octadecanethiol, fluorooctadecanethiol, and fluorododecanethiol. When the sulfonate surfactants are mixed with the light diffusion particles 1012 to be surface-modified, the sulfonate surface-active groups form sulfonate shell layers, such as benzene ring sulfonate shell layers, on the surface of the whiskers, which is beneficial to protect the light diffusion particles 1012, enhance the toughness of the light diffusion particles 1012, and reduce the breakage of the first type of light diffusion particles 1012_a_ and/or the second type of light diffusion particles 1012_b_ in the light diffusion film 101. When the thio surface-active group are mixed with the light diffusion particles 1012 to be surface-modified, the thio-type surface-active groups and hydroxyl groups on the surface of the whiskers form an O—S—O cross-linked network, and O—S—O has a relatively large bond energy, which is beneficial to protect the first type of light diffusion particles 1012_a_ and/or the second type of light diffusion particles 1012_b_, reduce the breakage of the first type of light diffusion particles 1012_a_ and/or the second-type light diffusion particles 1012_b_, and improve the effect of improving the optical functions such as contrast and brightness of the first type of light diffusion particles 1012_a_ and/or the second type of light diffusion particles 1012_b_ in the process of mixing the first type of light diffusion particles 1012_a_ and/or the second type of light diffusion particles 1012_b_ with the material of the substrate 1011 to form the light diffusion film 101. Optionally, the first type of light diffusion particles 1012_a_ and/or the second type of light diffusion particles 1012_b_ is/are surface-modified by at least one of sulfonate surfactants containing fluorine substituents or thio-surfactants containing fluorine substituents, specifically, at least one of sodium fluorododecyl sulfonates, fluorooctylthiols, and fluorododecylthiols. Since the fluorine atom has a high stability in the alkyl chain, the bond energy of the carbon-fluorine bond is higher than that of the carbon-carbon bond, and the carbon-fluorine bond has a shielding effect on the carbon-carbon bond, so it is beneficial to protect the carbon-carbon bond, thereby improving the stability of the first type of light diffusion particles 1012_a_ and/or the second type of light diffusion particles 1012_b_.

In some embodiments, an absolute value of a difference between the refractive indices of the substrate 1011 and the first type of light diffusion particles 1012_a_ and/or the second type of light diffusion particles 1012_b_ is greater than or equal to 0.1, for example, it may be 0.12, 0.13, 0.14, 0.15, 0.2, or the like, to achieve the light diffusion function of the light diffusion particles 1012. Similarly, an absolute value of a difference between the refractive indices of the third type of light diffusion particles 1012_c_ and the first type of substrate is greater than or equal to 0.1, for example, it may be 0.12, 0.13, 0.14, 0.15, 0.2, or the like.

In some embodiments, the glass transition temperature of the substrate 1011 ranges from 70° C. to 600° C., for example, it may be 80° C., 90° C., 100° C., 150° C., 200° C., 250° C., 300° C., 350° C., 400° C., 450° C., 500° C., 550° C., or the like.

In some embodiments, the elastic modulus of the substrate 1011 ranges from 500 MPa to 5000 MPa at 23° C., for example, it may be 600 MPa, 700 MPa, 800 MPa, 900 MPa, 1000 MPa, 1200 MPa, 1500 MPa, 1800 MPa, 2000 MPa, 2200 MPa, 2500 MPa, 2800 MPa, 3000 MPa, 3200 MPa, 3500 MPa, 3800 MPa, 4000 MPa, 4200 MPa, 4500 MPa, 4800 MPa, or the like.

In some embodiments, the elastic modulus of the substrate 1011 may be obtained at 50% humidity.

In some embodiments, the thickness of the light diffusion film 101 is greater than or equal to 5 microns and less than or equal to 500 microns, for example, it may be 10 microns, 50 microns, 100 microns, 150 microns, 200 microns, 250 microns, 300 microns, 350 microns, 400 microns, 450 microns, or the like, so as to facilitate the processing of the light diffusion film 101 and maintain appropriate light transmittance of the light diffusion film 101.

In some embodiments, the chromaticity viewing angle of the light diffusion film 101 is greater than or equal to 150 degrees, optionally greater than or equal to 160 degrees, as measured by CESI0.03.

In some embodiments, the haze of the light diffusion film 101 is greater than or equal to 20% and less than 100%, for example, it may be 30%, 40%, 50%, 60%, 70%, 80%, 90%, 95%, or the like. By adding the light diffusion particles 1012, the light diffusion film 101 can be adjusted and controlled in a wide range of haze, so as to obtain light diffusion film 101 that can meet the requirements of more types of products.

In some embodiments, the first type of substrate is selected from one of unmodified cellulose triacetate, unmodified polyethylene terephthalate, unmodified polycarbonate, unmodified polymethylmethacrylate, modified or unmodified polyolefin and unmodified polyethylene naphthalate. The second type of substrate is selected from at least one of unmodified cellulose triacetate, unmodified polyethylene terephthalate, unmodified polycarbonate, unmodified polymethylmethacrylate, modified or unmodified polyolefin and unmodified polyethylene naphthalate, and the second type of substrate is different from the first type of substrate.

The modified cellulose triacetate, modified polyethylene terephthalate, modified polycarbonate, modified polymethacrylate, modified polyolefin or modified polyethylene naphthalate may be obtained by subjecting unmodified cellulose triacetate, unmodified polyethylene terephthalate, unmodified polycarbonate, unmodified polymethacrylate, unmodified polyolefin or unmodified polyethylene naphthalate to hydrophilic modification or lipophilic modification, respectively. For example, the modified polyethylene terephthalate may be obtained by introducing linear alkyl side chains, carboxyl side chains, hydroxyl side chains, or side chains of fluorine-containing groups into the unmodified polyethylene terephthalate. When the modified polyethylene terephthalate is obtained by introducing carboxyl side chains and/or hydroxyl side chains into the unmodified polyethylene terephthalate, the modified polyethylene terephthalate may be obtained by introducing $$-\!(CH_2)_n\!-OH \quad \text{or} \quad -\!(CH_2)_m\!-COOH$$

group into the phenyl group of the unmodified polyethylene terephthalate, wherein n and m are both integers greater than or equal to 0 and less than or equal to 10.

In some embodiments, the first type of substrate is selected from one of unmodified cellulose triacetate, unmodified polyethylene terephthalate, unmodified polycarbonate, unmodified polymethylmethacrylate and unmodified polyethylene naphthalate. The second type of substrate is selected from at least one of modified polyethylene terephthalate, unmodified cellulose triacetate, unmodified polycarbonate, unmodified polymethylmethacrylate and unmodified polyethylene naphthalate, and the second type of substrate is different from the first type of substrate.

In some embodiments, the first type of substrate is selected from unmodified polyethylene terephthalate and the second type of substrate is selected from at least one of modified polyethylene terephthalate, unmodified cellulose triacetate, unmodified polycarbonate, unmodified polymethylmethacrylate, unmodified polyethylene naphthalate.

In some embodiments, the mass fraction of the first type of substrate in the substrate 1011 is greater than or equal to 60%, for example, it may be 65%, 70%, 75%, 80%, 85%, 90%, 95%, or the like. The mass fraction of the second type of substrate in the substrate 1011 is less than or equal to 40%, for example, it may be 5%, 10%, 15%, 20%, 25%, 30%, 35%, or the like.

In some embodiments, when the first type of substrate is miscible with the second type of substrate, the mass fraction of the first type of substrate in the substrate 1011 is greater than or equal to 70%, and the mass fraction of the second type of substrate in the substrate 1011 is less than or equal to 30%. For example, when the first type of substrate is selected from one of unmodified cellulose triacetate, unmodified polyethylene terephthalate, unmodified polymethylmethacrylate and unmodified polystyrene, the second type of substrate can be selected from one of unmodified cellulose triacetate, modified or unmodified polyethylene terephthalate, unmodified polymethylmethacrylate, unmodified polystyrene, so that the first type of substrate can be better mixed with the second type of substrate to obtain the substrate 1011 with improved mechanical properties, smoothness of appearance, crystallinity, or the like, and it is beneficial to improve the dispersibility of the light diffusion particles 1012 in the substrate 1011. In this case, the light diffusion particles are selected from the first type of light diffusion particles and the second type of light diffusion particles. Alternatively, the light diffusion particles are selected from at least one of the first type of light diffusion particles, the second type of light diffusion particles and the third type of light diffusion particles.

In some embodiments, when the first type of substrate and the second type of substrate are immiscible with each other, the mass fraction of the first type of substrate in the substrate 1011 is greater than or equal to 60%, and the mass fraction of the second type of substrate in the substrate 1011 is less than or equal to 40%. For example, when the first type of substrate is selected from modified or unmodified polyethylene terephthalate or unmodified polystyrene, the second type of substrate can be selected from unmodified polybutylene, so as to obtain sufficient light diffusion particles of the third type.

Further, the mass fraction of the first type of substrate in the substrate is greater than or equal to 60% and less than or equal to 70%. The mass fraction of the second type of substrate in the substrate 1011 is greater than or equal to 30% and less than or equal to 40%, for example, the mass fraction of the second type of substrate in the substrate 1011 may be 32%, 35%, 38%, or the like. The third type of light diffusion particles 1012*c* are formed by the second type of substrate. The second type of substrate is selected from a polymer immiscible with the first type of substrate. As a result, it is beneficial to obtain the third type of light diffusion particles 1012*c* whose ratio of the length of the long-axis of each of the third type of light diffusion particles 1012*c* to the diameter of each of the third type of light diffusion particles 1012*c* is greater than or equal to 20 and less than or equal to 100. The third type of light diffusion particles 1012*c* is selected from at least one type of the first sub-type of light diffusion particles, the second sub-type of light diffusion particles, the third sub-type of light diffusion particles, the fourth sub-type of light diffusion particles and the fifth sub-type of light diffusion particles. In this case, the light diffusion particles 1012*c* may be selected from at least two types of the first type of light diffusion particles, the second type of light diffusion particles and the third type of light diffusion particles. Specifically, the light diffusion particles 1012*c* may be selected from at least one of the first type of light diffusion particles and the third type of light diffusion particles, and the second type of light diffusion particles. The light diffusion particles 1012*c* may also be selected from the first type of light diffusion particles and the second type of light diffusion particles. The light diffusion particles 1012*c* may also be selected from the third type of light diffusion particles and the second type of light diffusion particles.

The mass fraction of the first type of substrate in the substrate is greater than or equal to 60% and less than or equal to 70%. The mass fraction of the second type of substrate in the substrate 1011 is greater than or equal to 30% and less than or equal to 40%. The third type of light diffusion particles 1012*c* is formed by the second type of substrate. When the second type of substrate is selected from a plurality of polymers immiscible with the first type of substrate, the polymers include a first type of polymers and a second type of polymers. When the mass fraction of the first type of polymers in the substrate 1011 is greater than or equal to 30% and less than or equal to 40%, and the mass fraction of the second type of polymers in the substrate 1011 is less than or equal to 10%, the ratio of the length of the long-axis of each of the third type of light diffusion particles 1012*c* (which is formed by the first type of polymers, that is, the third type of light diffusion particles 1012*c* has the same materials as the first type of polymers) to the diameter of each of the third type of light diffusion particles 1012*c* is greater than or equal to 20 and less than or equal to 100. The third type of light diffusion particles 1012*c* formed by the first type of polymers is selected from at least one type of the first sub-type of light diffusion particles, the second sub-type of light diffusion particles, the third sub-type of light diffusion particles, the fourth sub-type of light diffusion particles and the fifth sub-type of light diffusion particles. The ratio of the length of the long-axis of each of the third type of light diffusion particles 1012*c* (which is formed by the second type of polymers, that is, the third type of light diffusion particles 1012*c* has the same materials as the second type of polymers) to the diameter of each of the third type of light diffusion particles 1012*c* is greater than or equal to 1 and less than or equal to 5. The third type of light diffusion particles 1012*c* formed of the second type of polymer is selected from at least one of the sixth sub-type of light diffusion particles and the seventh sub-type of light diffusion particles. When the mass fraction of the first type of polymers in the substrate 1011 is less than 30%, and the mass fraction of the second type of polymers in the substrate 1011 is less than 30%, the ratio of the length of the long-axis of each of the third type of light diffusion particles 1012*c* (which is formed by the first type of polymers, that is, the third type of light diffusion particles 1012*c* has the same materials as the first type of polymers) to the diameter of each of the third type of light diffusion particles 1012*c* is greater than or equal to 1 and less than or equal to 5. The third type of light diffusion particles 1012*c* formed by the first type of polymers is selected from at least one of the sixth sub-type of light diffusion particles and the seventh sub-type of light diffusion particles. The ratio of the length of the long-axis of each of the third type of light diffusion particles 1012*c* (which is formed by the second type of polymers, that is, the third type of light diffusion particles 1012*c* has the same materials as the second type of polymers) to the diameter of each of the third type of light diffusion particles 1012*c* is greater than or equal to 1 and less than or equal to 5. The third type of light diffusion particles 1012*c* formed by the second type of polymers may be selected from at least one of the sixth sub-type of light diffusion particles and the seventh sub-type of light diffusion particles. In this case, the light diffusion particles 1012*c* may be selected from at least two types of the first type of light diffusion particles, the second type of light diffusion particles and the third type of light diffusion particles. Specifically, the light diffusion particles 1012*c* are selected from the first type of light diffusion particles and the second type of light diffusion particles. Alternatively, the light diffusion particles 1012*c* may be composed of the first type of light diffusion particles and the third type of light diffusion particles. Alternatively, the light diffusion particles 1012*c* may be composed of the first type of light diffusion particles, the second type of light diffusion particles and the third type of light diffusion particles.

The mass fraction of the first type of substrate in the substrate is greater than 70%. The mass fraction of the second type of substrate in the substrate 1011 is less than 30%, for example, it may be 5%, 10%, 15%, 20%, 25%, or the like. The third type of light diffusion particles 1012*c* are formed by the second type of substrate. The second type of substrate is selected from at least one polymer immiscible with the first type of substrate. As a result, it is advantageous to obtain the third type of light diffusion particles 1012*c* whose ratio of the length of the long-axis of each of the third type of light diffusion particles 1012*c* to the diameter of each of the third type of light diffusion particles 1012*c* is greater than or equal to 1 and less than or equal to 5. The third type of light diffusion particles 1012*c* is selected from at least one of the sixth sub-type of light diffusion particles or the seventh sub-type of light diffusion particles.

In some embodiments, the first type of substrate is selected from the unmodified polyethylene terephthalate or the unmodified polystyrene, and the second type of substrate is selected from the modified polyethylene terephthalate or the unmodified polybutylene. When the first type of substrate and the second type of substrate are selected from the above combinations, it is advantageous to significantly improve the optical performance of the substrate 1011.

For example, when the first type of substrate is selected from the unmodified polyethylene terephthalate and the second type of substrate is selected from the modified polyethylene terephthalate, since the modified polyethylene terephthalate is well miscible with the unmodified polyethylene terephthalate, it advantageous to improve the mechanical properties, smoothness and crystallinity of the substrate 1011, and the dispersibility of the light diffusion particles 1012, thereby improving the optical performance of the light diffusion film 101.

When the first substrate is selected from the unmodified polyethylene terephthalate, and the second substrate is selected from the unmodified polybutene, the unmodified polybutene forms the third type of light diffusion particles 1012*c*.

When the first type of substrate is selected from the unmodified polystyrene, and the second type of substrate is selected from the unmodified polybutene, the unmodified polybutene forms the third type of light diffusion particles 1012*c*.

In the light diffusion film 101 according to embodiments of the present disclosure, the second type of substrate is added into the first type of substrate, so that the optical performance of the substrate 1011 is improved. Further, the light diffusion particles 1012 are dispersed in the substrate 1011, optical defects such as moire patterns or white spots caused by the light diffusion film 101 can be avoided, and the chromaticity viewing angle and the contrast of the display device using the light diffusion film 101 is improved.

Referring to FIGS. 5 to 8, embodiments of the present disclosure further provide a polarizer 100 including a light diffusion film 101 as described above.

The polarizer 100 further includes: A polarizing layer 102 on one side of the light diffusion film 101.

Referring to FIGS. 5-8, in some embodiments, the polarizer 100 further includes a second optical function layer 103 disposed on at least one side of the substrate 1011.

The second optical function layer 103 is disposed between the polarizing layer 102 and the light diffusion film 101. Alternatively, the second optical function layer 103 is disposed on one side of the light diffusion film 101 away from the polarizing layer 102.

In some embodiments, the second optical function layer 103 is disposed on the side of the light diffusion film 101 away from the polarizing layer 102, and the polarizing plate 100 further includes a first adhesive layer 104 disposed in the light diffusion film 101 close to the polarizing layer 102.

The first adhesive layer 104 is in direct contact with the polarizing layer 102. Alternatively, the polarizing plate 100 further includes a protective layer 105 disposed between the light diffusion film 101 and the polarizing layer 102, and the first adhesive layer 104 is in direct contact with the protective layer 105.

In some embodiments, the first adhesive layer 104 is in direct contact with the light diffusion film 101, and the first adhesive layer 104 is in direct contact with the polarizing layer 102. Alternatively, the first adhesive layer 104 is in direct contact with the light diffusion film 101, and the first adhesive layer 104 is in direct contact with the protective layer 105.

In some embodiments, the first adhesive layer 104 may be selected from at least one of hydrogel, pressure-sensitive adhesive and ultraviolet adhesive. The material of hydrogel may be selected from a polyvinyl alcohol, the material of the pressure-sensitive adhesive may be selected from an acrylate copolymer, and the material of the ultraviolet adhesive may be selected from a polyfunctional acrylate monomer.

Figure 5:
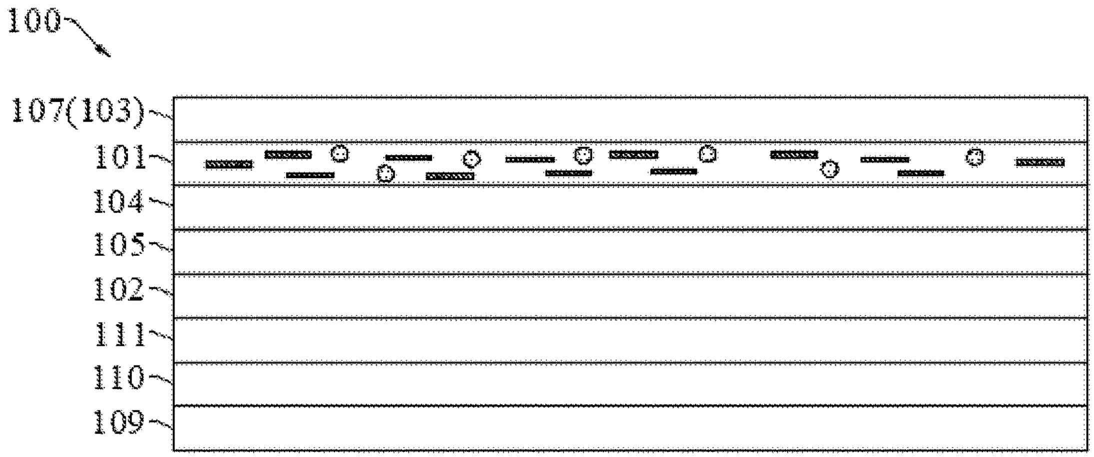
FIG. 5 is a schematic diagram of a first configuration of a polarizer according to some embodiments of the present disclosure.
Figure 6:
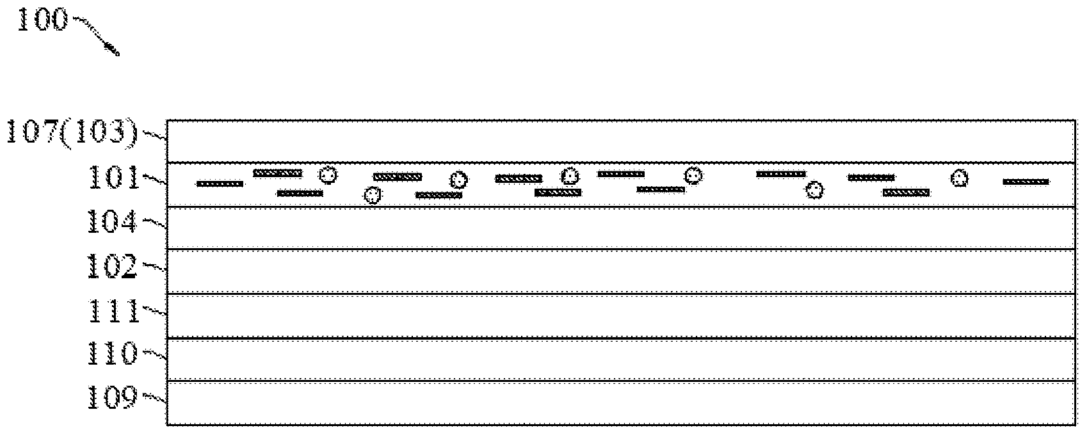
FIG. 6 is a schematic diagram of a second configuration of a polarizer according to some embodiments of the present disclosure.
Figure 7:
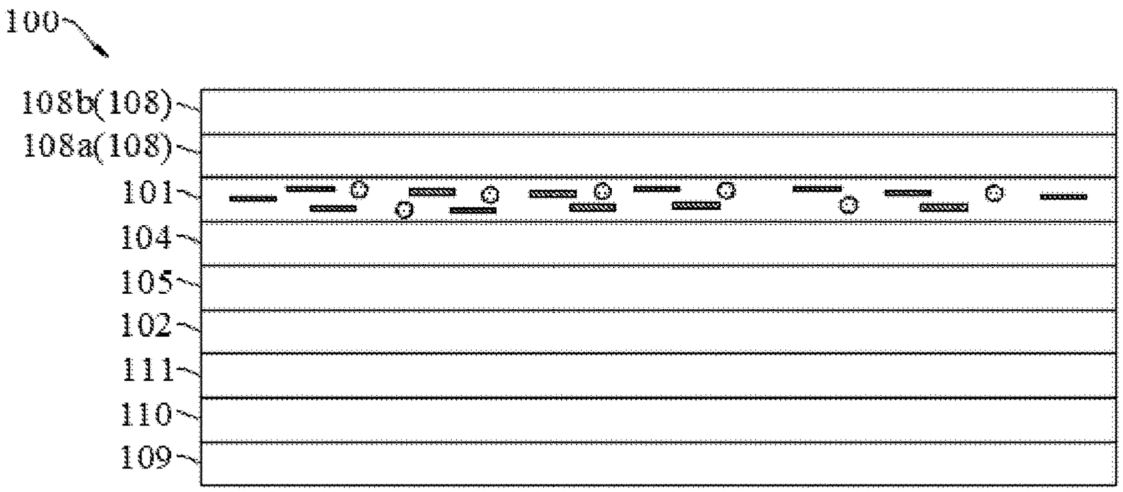
FIG. 7 is a schematic diagram of a third configuration of a polarizer according to some embodiments of the present disclosure.
Figure 8:
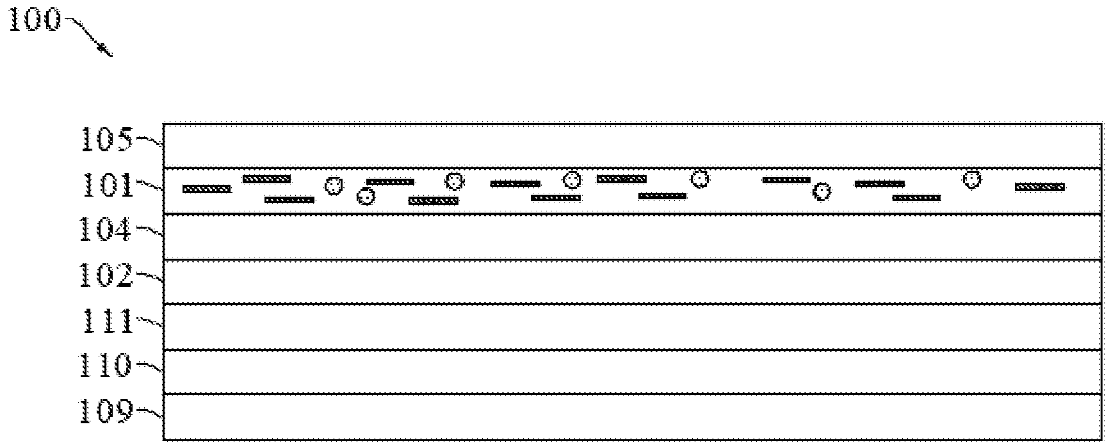
FIG. 8 is a schematic diagram of a fourth configuration of a polarizer according to some embodiments of the present disclosure.

Referring to FIGS. 5-7, in some embodiments, the second optical function layer 103 includes at least one of a transparent hardened sub-layer 107, a low reflection sublayer 108, an anti-reflection sub-layer, an anti-finger sub-layer and an anti-static sub-layer. When the second optical function layer 103 is a low-reflection sub-layer 108, the low-reflection sub-layer 108 may be formed by stacking a transparent hardened sub-portion 108*a* and a low-refraction sub-portion 108*b*.

In some embodiments, the polarizing layer 102 consists of polyvinyl alcohols and dyes.

In some embodiments, the polarizer 100 further includes a release layer 109 disposed on one side of the polarizing layer 102 away from the light diffusion film 101, and the release layer 109 is bonded to the polarizing layer 102 through a second adhesive layer 110. When the polarizer 100 is applied to a display device, the release layer 109 is removed to expose the second adhesive layer 110, so that the polarizer 100 is adhered to the display panel through the second adhesive layer 110.

In some embodiments, the polarizer 100 further includes a compensation layer 111 disposed between the second adhesive layer 110 and the polarizing layer 102.

In this embodiment of the present disclosure, by disposing the light diffusion film 101, optical defects such as moire patterns or white spots caused by the polarizer 100 can be avoided, and the chromaticity viewing angle and contrast of the display device using the polarizer 100 can be improved.

Figure 9:
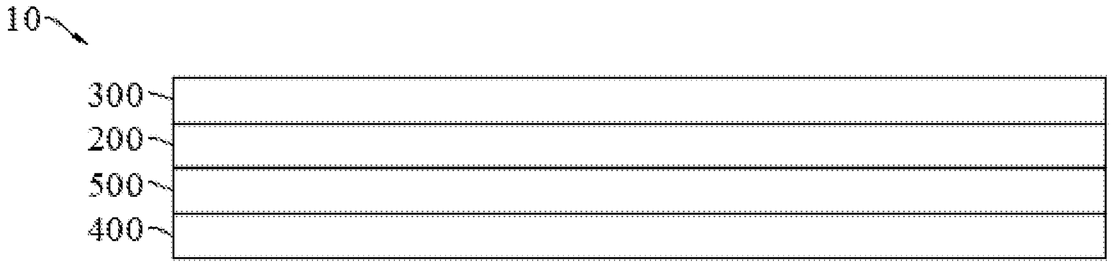
FIG. 9 is a schematic structural diagram of a display device according to some embodiments of the present disclosure.

Referring to FIG. 9, embodiments of the present disclosure further provide a display device 10 including a polarizer 100 as previously described.

Specifically, the display device includes a display panel 200 and a first polarizer 300 disposed on a light-emitting side of the display panel 200, and the first polarizer 300 is selected from the polarizer 100 as described above.

In some embodiments, the display panel 200 may be a liquid crystal display panel, a spontaneous display panel, or the like. The spontaneous display panel may be an organic Light-emitting diode (OLED) display panel, or the like.

In some embodiments, the light diffusion film in the first polarizer 300 is disposed on one side of the polarizer layer 102 in the first polarizer 300 away from the display panel.

When the display panel 200 is a liquid crystal display panel, the display device 10 further includes a backlight module 400 disposed on one side of the display panel 200 away from the first polarizer 300. The backlight module 400 is used to provide a light source for the display panel 200. The display device 10 also includes a second polarizer 500 disposed between the backlight module 400 and the display panel 200. The second polarizer 500 may be selected from the polarizer 100 as previously described, or the second polarizer 500 may not be selected from the polarizer 100 as previously described.

Next, the present disclosure will be described in more detail with reference to some examples. It should be noted, however, that these examples are provided for purposes of illustration only and should not be construed as limiting the present disclosure in any way.

Example 1

In the present example, a material of the first type of substrate is an unmodified polystyrene, and a material of the second type of substrate is a polybutene. The first type of substrate and the second type of substrate are mixed and then stretched longitudinally (in a first direction) and transversely (in a second direction) to form a substrate with a thickness of 100 microns. The mass fraction of the first type of substrate in the substrate is 80%, and the mass fraction of the second type of substrate is 20%. The second type of substrate forms a plurality of spherical light diffusion particles with an average diameter of 2 microns, and the spherical light diffusion particles are dispersed in the first type of substrate to form a light diffusion film 1.

Example 2

This example is the same as or similar to Example 1, and the differences lie in that: the mass fraction of the first type of substrate in the substrate is 60%; the mass fraction of the second type of substrate is 40%; the second type of substrate forms a plurality of rod-shaped light diffusion particles with an average long-axis length of 50 microns and an average diameter of 1.5 microns; and the rod-shaped light diffusion particles are dispersed in the first type of substrate to form a light diffusion film 2.

Example 3

This example is the same as or similar to Example 2, and the differences lie in that: the material of the first type of substrate is an unmodified polyethylene terephthalate; the material of the second type of substrate is a modified polyethylene terephthalate (it is modified by introducing groups $$-(CH_2)_n-OH \quad \text{or} \quad -(CH_2)_m-COOH$$

at two adjacent positions on the phenyl group of the polyethylene terephthalate, where both n and m are 10); the mass fraction of the first type of substrate in the substrate is 70%; and the mass fraction of the second type of substrate is 30%. Further, rod-shaped light diffusion particles (the first type of light diffusion particles) with an average length of 50 microns and an average diameter of 1.5 microns and spherical-shaped light diffusion particles (the second type of light diffusion particles) with an average diameter of 2 microns are added. The total amount of light diffusion particles added accounts for 2% of the mass fraction of the light diffusion film, wherein the mass fraction of the rod-shaped light diffusion particles in the light diffusion particles is 90%, and the mass fraction of the spherical-shaped light diffusion particles in the light diffusion particles is 10%. As a result, a light diffusion film 3 is formed.

Example 4

This example is similar to Example 3, and the differences lie in that: the materials of the second type of substrate are polymethylmethacrylates and polystyrenes; the mass fraction of the first type of substrate in the substrate is 80%; the mass fraction of the polymethylmethacrylates in the substrate is 10%; the mass fraction of the polystyrenes in the substrate is 10%; the total amount of the light diffusion particles added accounts for 1% of the mass fraction of the light diffusion film; the mass fraction of the rod-shaped light diffusion particles in the light diffusion particles is 90%; and the mass fraction of the spherical-shaped light diffusion particles in the light diffusion particles is 10%, thus forming a light diffusion film 4.

Example 5

This example is similar to Example 4, and the differences lie in that: the mass fraction of the first type of substrate in the substrate is 70%; the mass fraction of the polymethylmethacrylates in the substrate is 20%; and the mass fraction of the polystyrenes in the substrate is 10%; thus forming a light diffusion film 5.

It should be noted that the haze is measured by a haze measurement instrument NDH7000.

White-state brightness is the brightness when the display panel displays 255 grayscale white picture (white state), and the dark-state brightness is the brightness when the display panel displays 0 grayscale (dark state).

Dark state ratio refers to the ratio of the observed brightness of the display panel observed when the display panel is displayed in dark state at 30° or 60° from the center of the display panel to the brightness of the center of the display panel when the display panel is displayed in dark state.

Contrast is the ratio of the brightness of the display panel in the white state to brightness of the display panel in the dark state. In this test, what tested are the brightness of the center of the display panel in the white state and the brightness of the center of the display panel in the dark state.

Transmittance is the ratio of the white-state brightness to the brightness of the backlight module.

Chromaticity viewing angle measurement is carried out by the CESI0.03.

TABLE 1

| | Haze, % | White-state brightness | Dark-state brightness | Dark state ratio 30° | Dark state ratio 60° | Contrast | Transmittance, % | Chromaticity viewing angle, ° |
|---|---|---|---|---|---|---|---|---|
| Light diffusion film 1 | 33 | 310 | 0.093 | 2.65 | 2.73 | 3333 | 4.7 | 150 |
| Light diffusion film 2 | 45 | 326 | 0.091 | 2.74 | 2.81 | 3582 | 4.9 | >160 |
| Light diffusion film 3 | 92 | 202.42 | 0.1394 | 1.23 | 1.18 | 1452 | 3.09 | >160 |
| Light diffusion film 4 | 71 | 275 | 0.113 | 1.89 | 1.91 | 2433 | 4.2 | >160 |
| Light diffusion film 5 | 78 | 271 | 0.120 | 1.86 | 1.90 | 2258 | 4.1 | >160 |
| Comparative optical film 1 | 67 | 283 | 0.097 | 1.93 | 1.94 | 2917 | 4.3 | >160 |
| Comparative optical film 2 | 65 | 281 | 0.102 | 1.94 | 1.96 | 2754 | 4.3 | >160 |
| Comparative optical film 3 | 91 | 205.93 | 0.1438 | 1.31 | 1.24 | 1432 | 3.14 | >160 |

Comparative Example 1

This comparative example is similar to Example 4, and the differences lie in that: no second type of substrate is provided, thus forming a comparative optical film 1.

Comparative Example 2

This comparative example is similar to Comparative Example 1, and the differences lie in that: the mass fraction of rod-shaped light diffusion particles in the light diffusion particles is 95%; and the mass fraction of spherical-shaped light diffusion particles in the light diffusion particles is 5%; thus form a comparative optical film 2.

Comparative Example 3

This comparative example is similar to Example 3 and the differences lie in that: no second type of substrate is provided, thus forming a comparative optical film 3.

The light diffusion films obtained in Examples 1 to 5 and the comparative optical films obtained in Comparative Examples 1 to 3 are disposed on the side of the polarizer away from the display panel, and the polarizer is attached to the surface of a 75-inch liquid crystal display panel for carrying out optical effect testing, and the results are shown in Table 1. The polarizer to be tested includes a compensation layer, a polarizing layer, a protective layer, a light diffusion film (or a comparative optical film), and a transparent hardened sub-layer, that are sequentially stacked.

As can be seen from Table 1, by mixing the first type of substrate with the second type of substrate, when the first type of substrate and the second type of substrate are immiscible with each other, the second type of substrate can form spherical-shaped or rod-shaped particles. In case that the second type of substrate forms spherical-shaped particles, the haze of the light diffusion film can be effectively controlled. In case that the second type of substrate forms rod-shaped particles, the contrast and chromaticity viewing angles of the display device can be effectively improved. When the first type of substrate is miscible with the second type of substrate, the mixing of the first type of substrate and the second type of substrate can effectively improve the contrast and chromaticity viewing angles of the display device, as well as the optical performance such as the dark state ratio of the display device. Furthermore, the addition of light diffusion particles with different shapes can effectively improve the contrast and chromaticity viewing angles of the display device.

Embodiments of the present disclosure discloses a light diffusion film, a polarizer and a display device. The light diffusion film includes a substrate with a glass transition temperature ranging from 70° C. to 600° C. The substrate includes a first type of substrate and a second type of substrate with a material different from that of the first type substrate, and the second type of substrate is mixed in the first type substrate. The light diffusion particles are dispersed in the substrate. The mass fraction of the first type of substrate in the substrate is greater than or equal to 60%, and the mass fraction of the second type of substrate in the substrate is less than or equal to 40%. According to embodiments of the present disclosure, the optical performance of the substrate is improved by adding the second type of substrate to the first type of substrate. Further, the optical defects such as moire pattern or white spots caused by the light diffusion film are avoided, and the chromaticity viewing angle and the contrast of the display device using the light diffusion film are improved by dispersing the light diffusion particles in the substrate.

In view of the foregoing, the light diffusion film, polarizer, and display device provided in embodiments of the present disclosure have been described in detail above, and the principles and embodiments of the present disclosure are described by using specific examples herein. Descriptions of the above embodiments are merely intended to help understand the technical solutions and core ideas of the present disclosure. Meanwhile, a person with ordinary skill in the art should understand that therefore, there will be changes in the specific embodiments and application scope. In summary, the contents of the specification should not be construed as limiting the present disclosure.

What is claimed is:

1. A light diffusion film comprising:

a substrate with a glass transition temperature ranging from 70° C. to 600° C., the substrate comprising a first type of substrate and a second type of substrate, and the second type of substrate being mixed in the first type of substrate; and a plurality of light diffusion particles dispersed in the substrate;

wherein a mass fraction of the first type of substrate in the substrate is greater than or equal to 60%, and a mass fraction of the second type of substrate in the substrate is less than or equal to 40%; and wherein the first type of substrate is selected from one of a modified or an unmodified polyester, a modified or an unmodified polyolefin and a modified or an unmodified cellulose; the second type of substrate is selected from at least one of a modified or an unmodified polyester, a modified or an unmodified polyolefin and a modified or an unmodified cellulose; and the second type of substrate is different from the first type of substrate;

wherein the plurality of light diffusion particles comprise a plurality of first type of light diffusion particles and/or a plurality of second type of light diffusion particles; and wherein the plurality of first type of light diffusion particles are selected from at least one type of a first sub-type of light diffusion particles, a second sub-type of light diffusion particles, a third sub-type of light diffusion particles, a fourth sub-type of light diffusion particles, and a fifth sub-type of light diffusion particles with shapes different from each other, and the plurality of second type of light diffusion particles are selected from at least one type of a sixth sub-type of light diffusion particles and a seventh sub-type of light diffusion particles with shapes different from each other;

wherein a variation value of a diameter of each of the first sub-type of light diffusion particles is less than or equal to 0.3 microns in an extension direction of a long-axis of each of the first sub-type of light diffusion particles;

in an extension direction of a long-axis of each of the second sub-type of light diffusion particles, a variation value of a diameter of a middle portion of each of the second sub-type of light diffusion particles is less than or equal to 1 micron; and in a direction away from the middle portion of each of the second sub-type of light diffusion particles, a diameter of a first end portion of each of the second sub-type of light diffusion particles gradually decreases, and a variation value of a diameter of a second end portion of each of the second sub-type of light diffusion particles is less than or equal to 1 micron;

in an extension direction of a long-axis of each of the third sub-type of light diffusion particles, a variation value of a diameter of a middle portion of each of the third sub-type of light diffusion particles is less than or equal to 1 micron; and in a direction away from the middle portion of each of the third sub-type of light diffusion particles, a diameter of a first end portion of each of the third sub-type of light diffusion particles gradually decreases, and a diameter of a second end portion of each of the third sub-type of light diffusion particles gradually decreases;

a first end portion of each of the fourth sub-type of light diffusion particles is sequentially connected with a second end portion of each of the fourth sub-type of light diffusion particles, and a diameter of each of the fourth sub-type of light diffusion particles gradually decreases in a direction from the first end portion of each of the fourth sub-type of light diffusion particles to the second end portion of each of the fourth sub-type of light diffusion particles;

a first end portion of each of the fifth sub-type of light diffusion particles is sequentially connected with a second end portion of each of the fifth sub-type of light diffusion particles, a diameter of the first end portion of each of the fifth sub-type of light diffusion particles gradually decreases in a direction away from the second end portion of each of the fifth sub-type light diffusion particles, and a diameter of the second end portion of each of the fifth sub-type of light diffusion particles gradually decreases in a direction away from the first end portion of each of the fifth sub-type of light diffusion particles;

a variation value of a diameter of each of the sixth sub-type of light diffusion particles is less than or equal to 0.3 microns in an extension direction of a long-axis of each of the sixth sub-type of light diffusion particles; and a first end portion of each of the seventh sub-type of light diffusion particles is sequentially connected with a second end portion of each of the seventh sub-type of light diffusion particles, a diameter of the first end portion of each of the seventh sub-type of light diffusion particles gradually decreases in a direction away from the second end portion of each of the seventh sub-type light diffusion particles, and a diameter of the second end portion of each of the seventh sub-type of light diffusion particles gradually decreases in a direction away from the first end portion of each of the seventh sub-type of light diffusion particles.

2. The light diffusion film according to claim 1, wherein the first type of substrate is selected from one of an unmodified cellulose triacetate, an unmodified polyethylene terephthalate, an unmodified polycarbonate, an unmodified polymethylmethacrylate and an unmodified polyethylene naphthalate; and the second type of substrate is selected from at least one of a modified polyethylene terephthalate, an unmodified cellulose triacetate, an unmodified polycarbonate, an unmodified polymethylmethacrylate and an unmodified polyethylene naphthalate, and the second type of substrate is different from the first type of substrate.

3. The light diffusion film according to claim 1, wherein a ratio of a length of a long-axis of each of the plurality of first type of light diffusion particles to a diameter of each of the plurality of first type of light diffusion particles is greater than or equal to 20 and is less than or equal to 100; and wherein a ratio of a length of a long-axis of each of the plurality of second type of light diffusion particles to a diameter of each of the plurality of second type of light diffusion particles is greater than or equal to 1 and is less than or equal to 5.

4. The light diffusion film according to claim 1, wherein the first sub-type of light diffusion particles is selected from rod-shaped particles, the second sub-type of light diffusion particles is selected from needle-shaped particles with reduced diameters at one end, the third sub-type of light diffusion particles is selected from needle-shaped particles with reduced diameters at both ends, the fourth sub-type of light diffusion particles is selected from long cone-shaped particles, the fifth sub-type of light diffusion particles is selected from bi-conical-shaped particles, the sixth sub-type of light diffusion particles is selected from cube-shaped particles or cuboid-shaped particles, and the seventh sub-type of light diffusion particles is selected from spherical particles or ellipsoidal particles.

5. The light diffusion film according to claim 1, wherein the plurality of light diffusion particles further comprise a plurality of third type of light diffusion particles, and materials of the plurality of third type of light diffusion particles are the same as those of the plurality of second type of substrate;

wherein the plurality of third type of light diffusion particles are selected from at least one type of the first sub-type of light diffusion particles, the second sub-type of light diffusion particles, the third sub-type of light diffusion particles, the fourth sub-type of light diffusion particles, the fifth sub-type of light diffusion particles, the sixth sub-type of light diffusion particles and the seventh sub-type of light diffusion particles.

6. The light diffusion film according to claim 5, wherein the first type of substrate is miscible with the second type of substrate, the mass fraction of the first type of substrate in the substrate is greater than or equal to 70%, and the mass fraction of the second type of substrate in the substrate is less than or equal to 30%;

the plurality of light diffusion particles are composed of the plurality of first type of light diffusion particles and the plurality of second type of light diffusion particles; or, the plurality of light diffusion particles are composed of at least one of the plurality of first type of light diffusion particles and the plurality of second type of light diffusion particles, and the plurality of third type of light diffusion particles.

7. The light diffusion film according to claim 5, wherein the first type of substrate is immiscible with the second type of substrate, the mass fraction of the first type of substrate in the substrate is greater than or equal to 60% and less than or equal to 70%;

the mass fraction of the second type of substrate in the substrate is greater than or equal to 30% and less than or equal to 40%; and the plurality of third type of light diffusion particles are selected from at least one type of the first sub-type of light diffusion particles, the second sub-type of light diffusion particles, the third sub-type of light diffusion particles, the fourth sub-type of light diffusion particles and the fifth sub-type of light diffusion particles.

8. The light diffusion film according to claim 5, wherein the first type of substrate is immiscible with the second type of substrate, the mass fraction of the first type of substrate in the substrate is greater than 70%, and the mass fraction of the second type of substrate in the substrate is less than 30%;

wherein the plurality of third type of light diffusion particles are selected from at least one type of the sixth sub-type of light diffusion particles and the seventh sub-type of light diffusion particles.

9. The light diffusion film according to claim 7, wherein the plurality of light diffusion particles comprise a plurality of first type of light diffusion particles and/or a plurality of second type of light diffusion particles;

wherein a ratio of a length of a long-axis of each of the plurality of first type of light diffusion particles to a diameter of each of the plurality of first type of light diffusion particles is greater than or equal to 20 and is less than or equal to 100; and wherein a ratio of a length of a long-axis of each of the plurality of second type of light diffusion particles to a diameter of each of the plurality of second type of light diffusion particles is greater than or equal to 1 and is less than or equal to 5.

10. The light diffusion film according to claim 4, wherein the plurality of light diffusion particles further comprise a plurality of third type of light diffusion particles, and materials of the plurality of third type of light diffusion particles are the same as those of the plurality of second type of substrate;

wherein the plurality of third type of light diffusion particles are selected from at least one type of the first sub-type of light diffusion particles, the second sub-type of light diffusion particles, the third sub-type of light diffusion particles, the fourth sub-type of light diffusion particles, the fifth sub-type of light diffusion particles, the sixth sub-type of light diffusion particles and the seventh sub-type of light diffusion particles.

11. A polarizer comprising a light diffusion film, wherein the light diffusion film comprises:

a substrate with a glass transition temperature ranging from 70° C. to 600° C., the substrate comprising a first type of substrate and a second type of substrate, and the second type of substrate being mixed in the first type of substrate; and a plurality of light diffusion particles dispersed in the substrate;

wherein a mass fraction of the first type of substrate in the substrate is greater than or equal to 60%, and a mass fraction of the second type of substrate in the substrate is less than or equal to 40%; and wherein the first type of substrate is selected from one of a modified or an unmodified polyester, a modified or an unmodified polyolefin and a modified or an unmodified cellulose; the second type of substrate is selected from at least one of a modified or an unmodified polyester, a modified or an unmodified polyolefin and a modified or an unmodified cellulose; and the second type of substrate is different from the first type of substrate;

wherein the plurality of light diffusion particles comprise a plurality of first type of light diffusion particles and/or a plurality of second type of light diffusion particles; and wherein the plurality of first type of light diffusion particles are selected from at least one type of a first sub-type of light diffusion particles, a second sub-type of light diffusion particles, a third sub-type of light diffusion particles, a fourth sub-type of light diffusion particles, and a fifth sub-type of light diffusion particles with shapes different from each other, and the plurality of second type of light diffusion particles are selected from at least one type of a sixth sub-type of light diffusion particles and a seventh sub-type of light diffusion particles with shapes different from each other;

wherein a variation value of a diameter of each of the first sub-type of light diffusion particles is less than or equal to 0.3 microns in an extension direction of a long-axis of each of the first sub-type of light diffusion particles;

in an extension direction of a long-axis of each of the second sub-type of light diffusion particles, a variation value of a diameter of a middle portion of each of the second sub-type of light diffusion particles is less than or equal to 1 micron; and in a direction away from the middle portion of each of the second sub-type of light diffusion particles, a diameter of a first end portion of each of the second sub-type of light diffusion particles gradually decreases, and a variation value of a diameter of a second end portion of each of the second sub-type of light diffusion particles is less than or equal to 1 micron;

in an extension direction of a long-axis of each of the third sub-type of light diffusion particles, a variation value of a diameter of a middle portion of each of the third sub-type of light diffusion particles is less than or equal to 1 micron; and in a direction away from the middle portion of each of the third sub-type of light diffusion particles, a diameter of a first end portion of each of the third sub-type of light diffusion particles gradually decreases, and a diameter of a second end portion of each of the third sub-type of light diffusion particles gradually decreases;

a first end portion of each of the fourth sub-type of light diffusion particles is sequentially connected with a second end portion of each of the fourth sub-type of light diffusion particles, and a diameter of each of the fourth sub-type of light diffusion particles gradually decreases in a direction from the first end portion of each of the fourth sub-type of light diffusion particles to the second end portion of each of the fourth sub-type of light diffusion particles;

a first end portion of each of the fifth sub-type of light diffusion particles is sequentially connected with a second end portion of each of the fifth sub-type of light diffusion particles, a diameter of the first end portion of each of the fifth sub-type of light diffusion particles gradually decreases in a direction away from the second end portion of each of the fifth sub-type light diffusion particles, and a diameter of the second end portion of each of the fifth sub-type of light diffusion particles gradually decreases in a direction away from the first end portion of each of the fifth sub-type of light diffusion particles;

a variation value of a diameter of each of the sixth sub-type of light diffusion particles is less than or equal to 0.3 microns in an extension direction of a long-axis of each of the sixth sub-type of light diffusion particles; and a first end portion of each of the seventh sub-type of light diffusion particles is sequentially connected with a second end portion of each of the seventh sub-type of light diffusion particles, a diameter of the first end portion of each of the seventh sub-type of light diffusion particles gradually decreases in a direction away from the second end portion of each of the seventh sub-type light diffusion particles, and a diameter of the second end portion of each of the seventh sub-type of light diffusion particles gradually decreases in a direction away from the first end portion of each of the seventh sub-type of light diffusion particles.

12. The polarizer according to claim 11, wherein the first type of substrate is selected from one of an unmodified cellulose triacetate, an unmodified polyethylene terephthalate, an unmodified polycarbonate, an unmodified polymethylmethacrylate and an unmodified polyethylene naphthalate; and the second type of substrate is selected from at least one of a modified polyethylene terephthalate, an unmodified cellulose triacetate, an unmodified polycarbonate, an unmodified polymethylmethacrylate and an unmodified polyethylene naphthalate, and the second type of substrate is different from the first type of substrate.

13. The polarizer according to claim 11, wherein a ratio of a length of a long-axis of each of the plurality of first type of light diffusion particles to a diameter of each of the plurality of first type of light diffusion particles is greater than or equal to 20 and is less than or equal to 100; and wherein a ratio of a length of a long-axis of each of the plurality of second type of light diffusion particles to a diameter of each of the plurality of second type of light diffusion particles is greater than or equal to 1 and is less than or equal to 5.

14. The polarizer according to claim 11, wherein the first sub-type of light diffusion particles is selected from rod-shaped particles, the second sub-type of light diffusion particles is selected from needle-shaped particles with reduced diameters at one end, the third sub-type of light diffusion particles is selected from needle-shaped particles with reduced diameters at both ends, the fourth sub-type of light diffusion particles is selected from long cone-shaped particles, the fifth sub-type of light diffusion particles is selected from bi-conical-shaped particles, the sixth sub-type of light diffusion particles is selected from cube-shaped particles or cuboid-shaped particles, and the seventh sub-type of light diffusion particles is selected from spherical particles or ellipsoidal particles.

15. The polarizer according to claim 11, wherein the plurality of light diffusion particles further comprise a plurality of third type of light diffusion particles, and materials of the plurality of third type of light diffusion particles are the same as those of the plurality of second type of substrate;

wherein the plurality of third type of light diffusion particles are selected from at least one type of the first sub-type of light diffusion particles, the second sub-type of light diffusion particles, the third sub-type of light diffusion particles, the fourth sub-type of light diffusion particles, the fifth sub-type of light diffusion particles, the sixth sub-type of light diffusion particles and the seventh sub-type of light diffusion particles.

16. A display device comprising a polarizer, wherein the polarizer comprises a light diffusion film, and the light diffusion film comprises:

a substrate with a glass transition temperature ranging from 70° C. to 600° C., the substrate comprising a first type of substrate and a second type of substrate, and the second type of substrate being mixed in the first type of substrate; and a plurality of light diffusion particles dispersed in the substrate;

wherein a mass fraction of the first type of substrate in the substrate is greater than or equal to 60%, and a mass fraction of the second type of substrate in the substrate is less than or equal to 40%; and wherein the first type of substrate is selected from one of a modified or an unmodified polyester, a modified or an unmodified polyolefin and a modified or an unmodified cellulose; the second type of substrate is selected from at least one of a modified or an unmodified polyester, a modified or an unmodified polyolefin and a modified or an unmodified cellulose; and the second type of substrate is different from the first type of substrate;

wherein the plurality of light diffusion particles comprise a plurality of first type of light diffusion particles and/or a plurality of second type of light diffusion particles; and wherein the plurality of first type of light diffusion particles are selected from at least one type of a first sub-type of light diffusion particles, a second sub-type of light diffusion particles, a third sub-type of light diffusion particles, a fourth sub-type of light diffusion particles, and a fifth sub-type of light diffusion particles with shapes different from each other, and the plurality of second type of light diffusion particles are selected from at least one type of a sixth sub-type of light diffusion particles and a seventh sub-type of light diffusion particles with shapes different from each other;

wherein a variation value of a diameter of each of the first sub-type of light diffusion particles is less than or equal to 0.3 microns in an extension direction of a long-axis of each of the first sub-type of light diffusion particles;

in an extension direction of a long-axis of each of the second sub-type of light diffusion particles, a variation value of a diameter of a middle portion of each of the second sub-type of light diffusion particles is less than or equal to 1 micron; and in a direction away from the middle portion of each of the second sub-type of light diffusion particles, a diameter of a first end portion of each of the second sub-type of light diffusion particles gradually decreases, and a variation value of a diameter of a second end portion of each of the second sub-type of light diffusion particles is less than or equal to 1 micron;

in an extension direction of a long-axis of each of the third sub-type of light diffusion particles, a variation value of a diameter of a middle portion of each of the third sub-type of light diffusion particles is less than or equal to 1 micron; and in a direction away from the middle portion of each of the third sub-type of light diffusion particles, a diameter of a first end portion of each of the third sub-type of light diffusion particles gradually decreases, and a diameter of a second end portion of each of the third sub-type of light diffusion particles gradually decreases;

a first end portion of each of the fourth sub-type of light diffusion particles is sequentially connected with a second end portion of each of the fourth sub-type of light diffusion particles, and a diameter of each of the fourth sub-type of light diffusion particles gradually decreases in a direction from the first end portion of each of the fourth sub-type of light diffusion particles to the second end portion of each of the fourth sub-type of light diffusion particles;

a first end portion of each of the fifth sub-type of light diffusion particles is sequentially connected with a second end portion of each of the fifth sub-type of light diffusion particles, a diameter of the first end portion of each of the fifth sub-type of light diffusion particles gradually decreases in a direction away from the second end portion of each of the fifth sub-type light diffusion particles, and a diameter of the second end portion of each of the fifth sub-type of light diffusion particles gradually decreases in a direction away from the first end portion of each of the fifth sub-type of light diffusion particles;

a variation value of a diameter of each of the sixth sub-type of light diffusion particles is less than or equal to 0.3 microns in an extension direction of a long-axis of each of the sixth sub-type of light diffusion particles; and a first end portion of each of the seventh sub-type of light diffusion particles is sequentially connected with a second end portion of each of the seventh sub-type of light diffusion particles, a diameter of the first end portion of each of the seventh sub-type of light diffusion particles gradually decreases in a direction away from the second end portion of each of the seventh sub-type light diffusion particles, and a diameter of the second end portion of each of the seventh sub-type of light diffusion particles gradually decreases in a direction away from the first end portion of each of the seventh sub-type of light diffusion particles.

17. The display device according to claim 16, wherein the first type of substrate is selected from one of an unmodified cellulose triacetate, an unmodified polyethylene terephthalate, an unmodified polycarbonate, an unmodified polymethylmethacrylate and an unmodified polyethylene naphthalate; and the second type of substrate is selected from at least one of a modified polyethylene terephthalate, an unmodified cellulose triacetate, an unmodified polycarbonate, an unmodified polymethylmethacrylate and an unmodified polyethylene naphthalate, and the second type of substrate is different from the first type of substrate.

18. The display device according to claim 16, wherein a ratio of a length of a long-axis of each of the plurality of first type of light diffusion particles to a diameter of each of the plurality of first type of light diffusion particles is greater than or equal to 20 and is less than or equal to 100; and wherein a ratio of a length of a long-axis of each of the plurality of second type of light diffusion particles to a diameter of each of the plurality of second type of light diffusion particles is greater than or equal to 1 and is less than or equal to 5.

* * * * *